US012783259B2

(12) United States Patent
Kim et al.

(10) Patent No.: US 12,783,259 B2
(45) Date of Patent: Nov. 3, 2026

(54) OPERATION METHOD OF HOST CONTROLLING COMPUTING DEVICE, AND OPERATION METHOD OF ARTIFICIAL INTELLIGENCE SYSTEM INCLUDING COMPUTING DEVICE AND HOST

(71) Applicant: Samsung Electronics Co., Ltd., Suwon-si (KR)

(72) Inventors: Chansoo Kim, Suwon-si (KR); Hwang Lee, Suwon-si (KR); Jae Hun Jang, Suwon-si (KR); Younho Jeon, Suwon-si (KR); Wan Heo, Suwon-si (KR); Sejung Kwon, Seongnam-si (KR); Byeonguk Kim, Seongnam-si (KR); Baeseong Park, Seongnam-si (KR); Dongsoo Lee, Seongnam-si (KR)

(73) Assignees: Samsung Electronics Co., Ltd., Suwon-si (KR); Naver Corporation, Seongnam-si (KR)

( * ) Notice: Subject to any disclaimer, the term of this patent is extended or adjusted under 35 U.S.C. 154(b) by 91 days.

(21) Appl. No.: 19/029,311

(22) Filed: Jan. 17, 2025

(65) Prior Publication Data

US 2025/0258679 A1 Aug. 14, 2025

(30) Foreign Application Priority Data

Feb. 8, 2024 (KR) ........................ 10-2024-0019667

(51) Int. Cl.
*G06F 9/445* (2018.01)

(52) U.S. Cl.
CPC ................................ *G06F 9/44505* (2013.01)

(58) Field of Classification Search
None
See application file for complete search history.

(56) References Cited

U.S. PATENT DOCUMENTS 10,402,120 B2 9/2019 Balakrishnan
11,086,534 B2 8/2021 Biswas et al.
(Continued)

FOREIGN PATENT DOCUMENTS

CN 113469350 A 10/2021
KR 10-2025-0115812 A 7/2025
WO 2020/038551 A1 2/2020

OTHER PUBLICATIONS

Efficient Acceleration of Deep Learning Inference on Resource Constrained Edge Devices (Year: 2023).*
(Continued)

*Primary Examiner* — Kim Huynh
(74) *Attorney, Agent, or Firm* — Fish & Richardson P.C.

(57) ABSTRACT

Disclosed is an operation method of a host which controls a computing device performing an artificial intelligence computation. The operation method includes receiving configuration information from the computation device, generating a plurality of lightening weight data by performing lightening on weight data based on the configuration information, generating a plurality of files by performing an aligning operation on the plurality of lightening weight data based on the configuration information, and loading the plurality of files into a memory device of the computing device. The configuration information includes channel information about a plurality of channels between the memory device and an accelerator, which are included in the computing device, and the number of the plurality of files is equal to the number of the plurality of channels.

20 Claims, 20 Drawing Sheets

(56) References Cited

U.S. PATENT DOCUMENTS

| | | | | |
|---|---|---|---|---|
| 2022/0036193 | A1* | 2/2022 | Prediger | G06N 3/0495 |
| 2022/0309011 | A1 | 9/2022 | Nagarajan et al. | |
| 2022/0374348 | A1 | 11/2022 | Hazel et al. | |
| 2023/0351185 | A1* | 11/2023 | Guo | G06N 3/082 |
| 2024/0005160 | A1* | 1/2024 | Aguilar | G06N 3/082 |

OTHER PUBLICATIONS

Lightweight Deep Learning—An Overview. (Year: 2024).*

Extended European Search Report in European Appln. No. 25153947.4, mailed on Jul. 22, 2025, 12 pages.

Lascorz et al., "APack: Off-Chip, Lossless Data Compression for Efficient Deep Learning Inference," CoRR, Submitted on Jan. 21, 2022, arXiv:2201.08830v1, 13 pages.

Yu et al., "SPRING: A Sparsity-Aware Reduced-Precision Monolithic 3D CNN Accelerator Architecture for Training and Inference," IEEE Transactions on Emerging Topics in Computing, Jan.-Mar. 2022, available online Jun. 18, 2020, 10(1):237-249.

* cited by examiner

[t0-t1 period]

[t1-t2 period]

[t2~t3 period]

OPERATION METHOD OF HOST CONTROLLING COMPUTING DEVICE, AND OPERATION METHOD OF ARTIFICIAL INTELLIGENCE SYSTEM INCLUDING COMPUTING DEVICE AND HOST

CROSS-REFERENCE TO RELATED APPLICATIONS

This application claims priority under 35 U.S.C. § 119 to Korean Patent Application No. 10-2024-0019667 filed on Feb. 8, 2024, in the Korean Intellectual Property Office, the disclosures of which are incorporated by reference herein in their entireties.

BACKGROUND

Embodiments of the present disclosure described herein relate to artificial intelligence, and more particularly, relate to an operation method of a host controlling a computing device and an operation method of an artificial intelligence system including the computing device and the host.

The artificial intelligence (AI) is a field of computer science which simulates various human abilities such as learning, inference, and perception. Nowadays, artificial intelligence is widely used in various fields such as understanding natural languages, translation of natural languages, robotics, artificial vision, problem solving, learning, knowledge acquisition, and cognitive science by enabling computer systems to make inferences that would otherwise be impractical for a human to make and/or enabling the computer systems to make decisions without additional human input.

The artificial intelligence is implemented based on various algorithms. As an example, a neural network consists of a complex network in which nodes and synapses are repeatedly connected. Signal processing may be variously performed based on a relevant synapse in the process of transferring data from a current node to a next node, and this signal processing process is called a layer. That is, the neural network may include various layers which are complexly connected to each other. Because various layers included in the neural network require a large amount of computation and a large amount of data, various methods for optimizing the computation amount and the data amount are being developed.

SUMMARY

Embodiments of the present disclosure provide an operation method of a host controlling a computing device with improved performance and an operation method of an artificial intelligence system including the computing device and the host.

According to at least one embodiment, an operation method of a host configured to control a computing device performing an artificial intelligence computation includes receiving configuration information from the computation device, generating a plurality of lightening weight data by performing lightening on weight data based on the configuration information, generating a plurality of files by performing an aligning operation on the plurality of lightening weight data based on the configuration information, and loading the plurality of files into a memory device of the computing device. The configuration information includes channel information about a plurality of channels between the memory device of the computing device and an accelerator of the computing device, and the number of the plurality of files generated is equal to the number of the plurality of channels.

According to at least one embodiment, an operation method of a host configured to control a computing device performing an artificial intelligence computation includes receiving configuration information from the computation device, generating first lightening weight data including first weight fragments and second lightening weight data including second weight fragments by performing a lightening operation on first weight data and second weight data based on the configuration information, generating a plurality of files by performing an aligning operation on the first weight fragments and the second weight fragments, and loading the plurality of files into a plurality of memories of the computing device. The configuration information includes channel information about a plurality of channels between the plurality of memories of the computing device and an accelerator of the computing device, the number of the plurality of files generated is equal to the number of the plurality of channels, the first weight fragments are distributed to the plurality of files, and the second weight fragments are distributed to the plurality of files.

According to at least one embodiment, an operation method of an artificial intelligence system which includes a computing device configured to perform an artificial intelligence computation and a host configured to communicate with the computing device, the method includes receiving, by the host, configuration information of the computation device, generating, by the host, a plurality of files by performing a lightening operation and an aligning operation on weight data based on the configuration information, loading, by the host, the plurality of files into a plurality of memories of the computing device, reading out, by the computing device, the plurality of files by performing direct memory access (DMA) operations on the plurality of memories in parallel, and performing, by the computing device, an artificial intelligence computation based on the plurality of files. The configuration information includes channel information about a plurality of channels between the plurality of memories of the computing device and an accelerator of the computing devices, and the generating, by the host, the plurality of files includes generating the plurality of files such that the number of the plurality of files is equal to the number of the plurality of channels.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that an ordinary one in the art easily carries out the present disclosure.

In the detailed description or drawings, functional blocks which are expressed by using the terms "unit", "element," "module", etc. may be implemented in the form of processing circuitry such as hardware, software, or a combination thereof, which is configured to perform a specific function. As an example, a "lightening module" may be hardware or software configured to support a data lightening operation or function disclosed in the specification, or a combination thereof. In at least some embodiments the processing circuitry more specifically may be included in (and/or enabled by), but is not limited to, a central processing unit (CPU), an arithmetic logic unit (ALU), a digital signal processor, a microcomputer, a field programmable gate array (FPGA), a System-on-Chip, (SoC), a programmable logic unit, a microprocessor, application-specific integrated circuit (ASIC), etc. and/or may include active and/or passive electrical components such as transistors, resistors, capacitors, etc., and/or electronic circuits including one or more of said components configured to perform and/or enable the function of the functional blocks.

Figure 1:
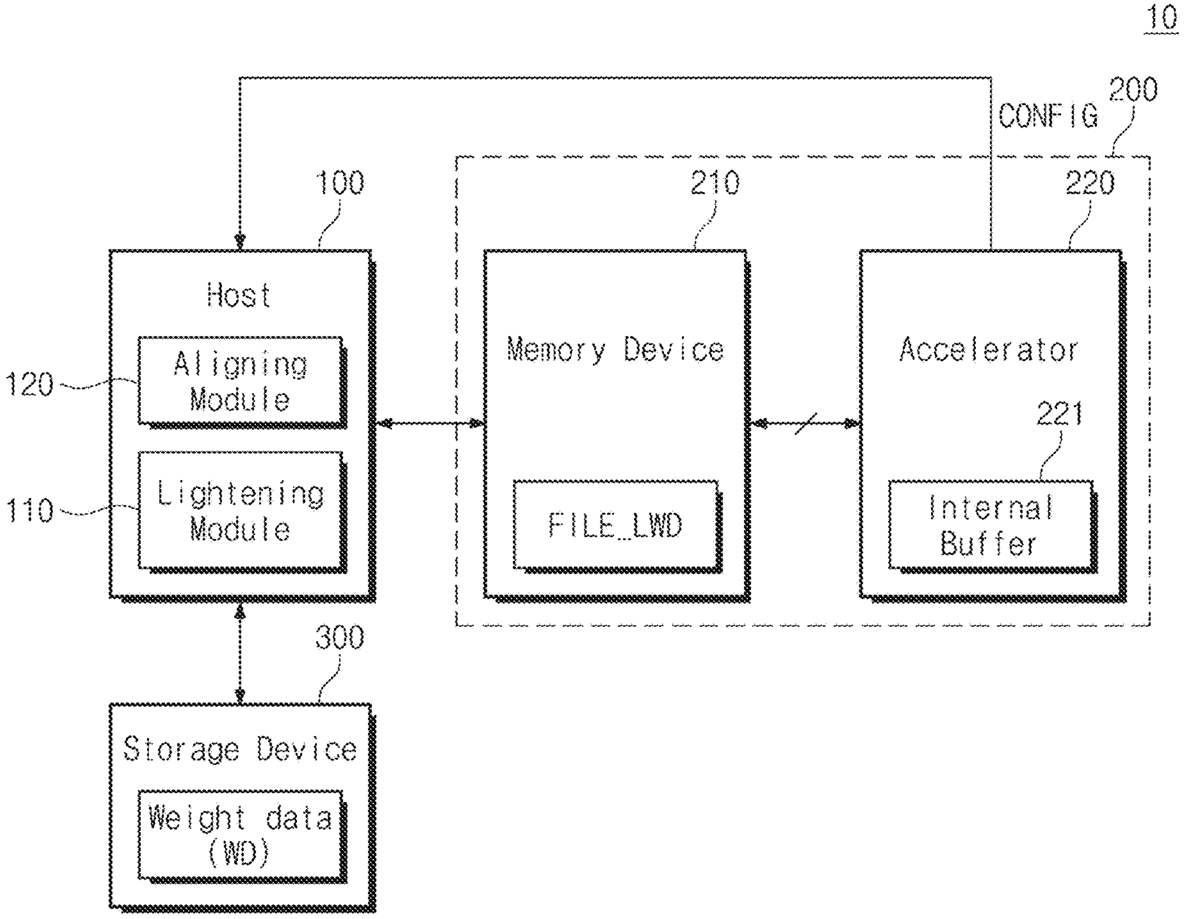
FIG. 1 is a block diagram illustrating an artificial intelligence system according to at least one embodiment of the present disclosure.

FIG. 1 is a block diagram illustrating an artificial intelligence system according to at least one embodiment of the present disclosure. Referring to FIG. 1, an artificial intelligence system 10 may include a host 100, an artificial intelligence computing device 200, and a storage device 300. In at least one embodiment, the artificial intelligence system 10 may be configured to perform various artificial intelligence-based operations such as computation, inference, or learning. The artificial intelligence system 10 may include a graphics processing unit (GPU), a neural processing unit (NPU), or separate dedicated hardware. Alternatively, the artificial intelligence system 10 may be included in an application processor (AP) and/or a mobile device. For example, artificial intelligence system 10 may be configured to perform voice recognition, text-to-speech, image recognition, image classification, and/or image processing by using a neural network, and may be included in, e.g., a tablet device, a smart TV, an augmented reality (AR) device, an Internet of things (IoT) device, a self-driving vehicle, robots, a medical device, a drone, an advanced drivers assistance system (ADAS), an image display device, a data processing server, a measuring device, etc. and/or may be mounted in one of various kinds of electronic devices.

In at least one embodiment, the host 100 may include a processor configured to perform various computations in the artificial intelligence system 10 and/or to execute various operating systems or various applications. The processor may control various components of the artificial intelligence system 10 depending on requests of the operating systems or applications. The processor may include a central processing unit (CPU) and/or an application processor (CP) which includes one or more processing cores.

The artificial intelligence computing device (for convenience of description, hereinafter referred to as a "computing device") 200 may be configured to perform various artificial intelligence operations under control of the host 100. For example, the computing device 200 may be configured to perform the artificial intelligence computation, inference, and/or learning based on an artificial intelligence model and/or a weight provided, e.g., from the host 100.

In at least one embodiment, the artificial intelligence model and/or the weight may be generated through machine learning. The machine learning may include various learning schemes such as supervised learning, unsupervised learning, semi-supervised learning, and/or reinforcement learning, but the present disclosure is not limited thereto.

In at least one embodiment, the artificial intelligence model may be generated or trained through one of various neural networks such as a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, and/or a combination of two or more thereof. Alternatively, the artificial intelligence model may be a large language model (LLM) configured to perform natural language processing (NLP) and may be trained or generated by using a transformer model. The artificial intelligence model may include a plurality of neural network layers, and each of the plurality of neural network layers may be configured to perform an artificial intelligence computation based on the trained model or weight.

The storage device 300 may be configured to store various information or various data which are used in the artificial intelligence system 10. For example, the storage device 300 may be configured to store weight data WD enabling the computing device 200 to perform the artificial intelligence computation, inference, and/or learning. In at least one embodiment, the weight data WD may be information generated by the learning of the computing device 200. In at least one embodiment, the storage device 300 may be a high-capacity storage medium such as a solid state drive (SSD). However, the present disclosure is not limited thereto. For example, the storage device 300 may be a high-capacity storage medium such as a universal flash storage (UFS) card, an embedded UFS, or a hard disk drive (HDD) and/or may be an external storage server connected through a separate communication line.

In at least one embodiment, the weight data WD may be based on the large model, such as a large language model. In this case, the size of the weight data WD may be very large. Because the resource of the computing device 200 (e.g., the capacity of a memory device 210) is limited. Accordingly, the host 100 may reduce the size of the weight data WD and may load the weight data WD with the reduced size into the computing device 200, thus the entire weight data WD may not be loaded to the computing device 200 . . .

For example, the host 100 may include a lightening module 110 and an aligning module 120. The lightening module 110 may perform lightening on the weight data WD stored in the storage device 300. In at least one embodiment, the lightening may indicate an operation, method, and/or a technique for reducing the size and/or capacity of the weight data WD (such as pruning, quantization, compression, knowledge distillation, etc. of the weight data WD). The pruning indicates a technique for reducing the capacity of the weight data WD by removing a value less than or equal to a reference value from the weight data WD. The quantization indicates a technique for reducing the capacity of the weight data WD by converting the number of bits expressed in the weight data WD into the number of bits with relatively low precision. The compression indicates a technique for reducing the capacity of the weight data WD by compressing the weight data WD. The knowledge distillation indicates a technique for reducing the capacity of the weight data WD by training a lightening student model by using the weight data WD as a teacher model.

The above lightening techniques are provided only as some examples, and the present disclosure is not limited thereto. The lightening module 110 may be configured to generate lightening weight data LWD by lightening the weight data WD based on various lightening techniques depending on a kind of an artificial intelligence computation to be performed in the computing device 200 or a kind of an artificial intelligence model.

The aligning module 120 may be configured to generate a lightening weight data file (for convenience of description, hereinafter referred to as a "lightening weight file") FILE_LWD by aligning the lightening weight data LWD based on configuration information CONFIG of the computing device 200. For example, the computing device 200 may include the memory device 210 and an accelerator 220. The accelerator 220 may be configured to communicate with the memory device 210 through a plurality of channels. The aligning module 120 may align the lightening weight data LWD based on the configuration information CONFIG such that the lightening weight file FILE_LWD is efficiently transmitted from the memory device 210 to the accelerator 220. In at least one embodiment, the configuration information CONFIG may include information about the number of channels between the memory device 210 and the accelerator 220 included in the computing device 200 and information about a quantization type. For example, the configuration information CONFIG may include quantization information indicating, e.g., the number of weight fragments to be included in each of the plurality of lightening weight data LWD. The lightening weight data LWD may be loaded into the memory device 210. An aligning operation of the aligning module 120 will be described in detail with reference to the following drawings.

In at least one embodiment, the accelerator 220 may include an internal buffer 221. The accelerator 220 may store the lightening weight file FILE_LWD received from the memory device 210 in the internal buffer 221. The accelerator 220 may be configured to generate the lightening weight data LWD based on the lightening weight file FILE_LWD stored in the internal buffer 221 and to perform an artificial intelligence computation based on the lightening weight data LWD.

As described above, the host 100 according to at least one embodiment of the present disclosure may generate the lightening weight file FILE_LWD by aligning the lightening weight data LWD based on the configuration information CONFIG of the computing device 200. The lightening weight file FILE_LWD may be loaded into the memory device 210 of the computing device 200, e.g., by the host 100. In this case, the accelerator 220 of the computing device 200 may receive the lightening weight file FILE_LWD from the memory device 210 through the plurality of channels, and thus, the performance of the computing device 200 is improved.

Figure 2:
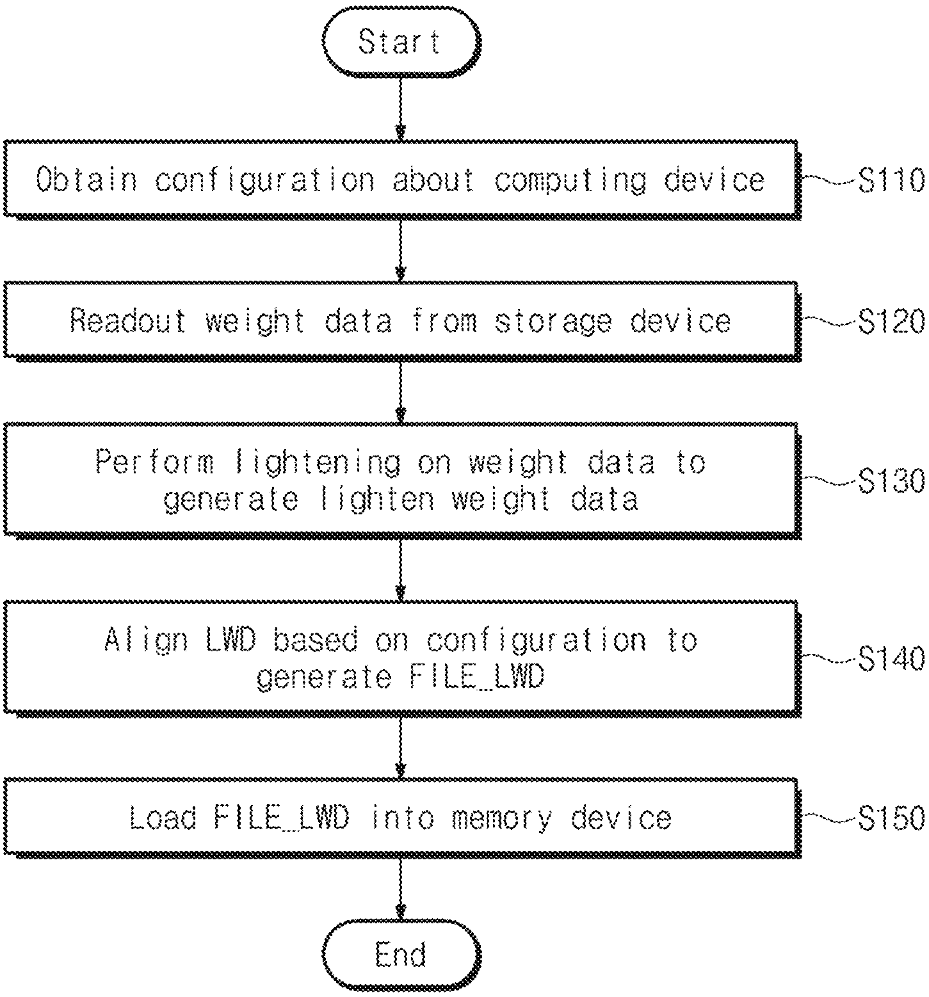
FIG. 2 is a flowchart illustrating an operation of a host of FIG. 1.

FIG. 2 is a flowchart illustrating an operation of a host of FIG. 1. Referring to FIGS. 1 and 2, in operation S110, the host 100 may obtain or collect the configuration information CONFIG about the computing device 200. In at least one embodiment, the host 100 may receive the configuration information CONFIG from the computing device 200 and/or the accelerator 220 of the computing device 200. In at least one embodiment, the configuration information CONFIG may be received in an initialization operation of the computing device 200. Alternatively, the configuration information CONFIG may be obtained from the computing device 200 in response to a request of the host 100. In at least one embodiment, the configuration information CONFIG may include information about the number of channels between the memory device 210 and the accelerator 220 included in the computing device 200 and information about a quantization type.

In operation S120, the host 100 may read out the weight data WD from the storage device 300.

In operation S130, the host 100 may generate the lightening weight data LWD by performing lightening on the weight data WD read from the storage device 300. For example, the lightening module 110 of the host 100 may apply various lightening techniques to the weight data WD and/or perform various lightening operation on the weight data WD. In this case, the lightening on the weight data WD may be performed based on the configuration information CONFIG received from the computing device 200. That is, the lightening module 110 may generate the lightening weight data LWD by performing lightening on the weight data WD such that a format requirement of the computing device 200 is satisfied. In at least one embodiment, the lightening weight data LWD may include a plurality of weight fragments. The number of weight fragments and/or the sizes of the plurality of weight fragments may be determined depending on a quantization technique (or operation) and/or a compression technique (or operation) which the computing device 200 supports.

In operation S140, the host 100 may generate the lightening weight file FILE_LWD by aligning the lightening weight data LWD based on the configuration information CONFIG. For example, the host 100 may align the lightening weight data LWD such that the lightening weight file FILE_LWD is efficiently transmitted from the memory device 210 to the accelerator 220. Operation S140 will be described in detail with reference to the following drawings.

In operation S150, the host 100 may load the lightening weight file FILE_LWD into the memory device 210.

Figure 3:
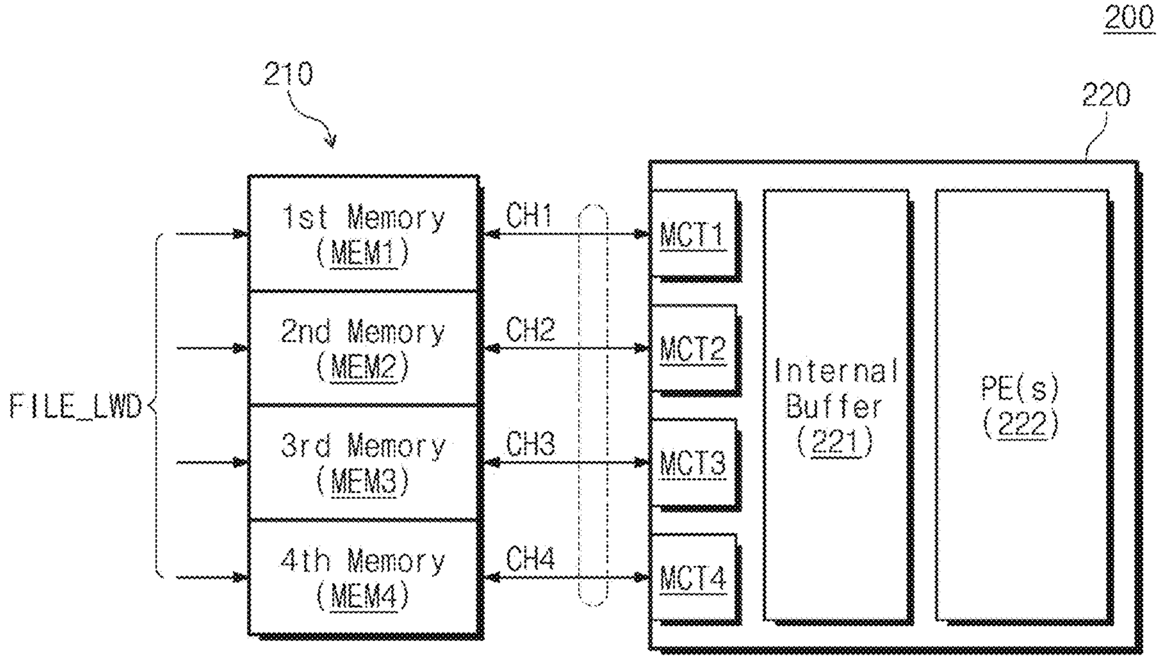
FIG. 3 is a block diagram illustrating a computing device of FIG. 1.

FIG. 3 is a block diagram illustrating a computing device of FIG. 1. Referring to FIGS. 1 and 3, the computing device 200 may include the memory device 210 and the accelerator 220.

The memory device 210 may include a plurality of memories MEM1 to MEM4. The plurality of memories MEM1 to MEM4 may indicate memory spaces which are physically and/or logically separated and/or distinguished from each other. For example, in at least one embodiment, each of the plurality of memories MEM1 to MEM4 may be implemented with a separate die, a separate chip, a separate device, and/or a separate module. The plurality of memories MEM1 to MEM4 may be configured to communicate with the accelerator 220 through a plurality of channels CH1 to CH4. In at least one embodiment, the plurality of channels CH1 to CH4 may indicate available communication paths which enable communication independently from each other.

The accelerator 220 may communicate with the plurality of memories MEM1 to MEM4 through the plurality of channels CH1 to CH4, respectively. The accelerator 220 may include a plurality of memory controllers MCT1 to MCT4, the internal buffer 221, and a processing element (PE) 222.

The plurality of memory controllers MCT1 to MCT4 may communicate with the plurality of memories MEM1 to MEM4 through the plurality of channels CH1 to CH4, respectively. In at least one embodiment, the plurality of memory controllers MCT1 to MCT4 may read out data or files stored in the plurality of memories MEM1 to MEM4 through a direct memory access (DMA) operation. For example, the first memory controller MCT1 may perform a first DMA operation on the first memory MEM1 through the first channel CH1; the second memory controller MCT2 may perform a second DMA operation on the second memory MEM2 through the second channel CH2; the third memory controller MCT3 may perform a third DMA operation on the third memory MEM3 through the third channel CH3; the fourth memory controller MCT4 may perform a fourth DMA operation on the fourth memory MEM4 through the fourth channel CH4; etc.

In at least one embodiment, the plurality of memory controllers MCT1 to MCT4 may perform the DMA operations independently of each other or in parallel. In at least one embodiment, the direct memory access (DMA) operation of each of the plurality of memory controllers MCT1 to MCT4 may be initiated or set by a separate DMA controller.

The internal buffer 221 may be configured to temporarily store data or files received through the plurality of memory controllers MCT1 to MCT4.

The processing element 222 may perform the artificial intelligence computation based on the data temporarily stored in the internal buffer 221. For example, the processing element 222 may perform a multiply and accumulate (MAC) operation on weight data and activate data stored in the internal buffer 221. In at least one embodiment, a computational result of the processing element 222 may be stored in the internal buffer 221 or the plurality of memories MEM1 to MEM4.

As described above, the memory device 210 and the accelerator 220 of the computing device 200 may communicate with each other through the plurality of channels CH1 to CH4 to improve a transmission speed. However, because a conventional host uploads weight data to the memory device 210 regardless of a structure of the memory device 210 and the accelerator 220 included in the computing device 200, the data transmission between the memory device 210 and the accelerator 220 is not efficiently performed. For example, the conventional host may upload lightening weight data to the memory device 210 in the form of a single file. In this case, even though the memory device 210 and the accelerator 220 communicate with each other through the plurality of channels CH1 to CH4, the accelerator 220 can only access the lightening weight data from the memory device 210 through a single channel.

In contrast, according to the embodiments of the present disclosure, the aligning module 120 of the host 100 may align the lightening weight data LWD to a plurality of files based on the configuration information CONFIG of the computing device 200. The plurality of files may be respectively loaded into the plurality of memories MEM1 to MEM4 of the memory device 210. In this case, the accelerator 220 may access the plurality of files from the plurality of memories MEM1 to MEM4 simultaneously, independently, and/or in parallel. Accordingly, a speed at which the accelerator 220 accesses lightening weight data from the memory device 210 is improved.

Figure 4:
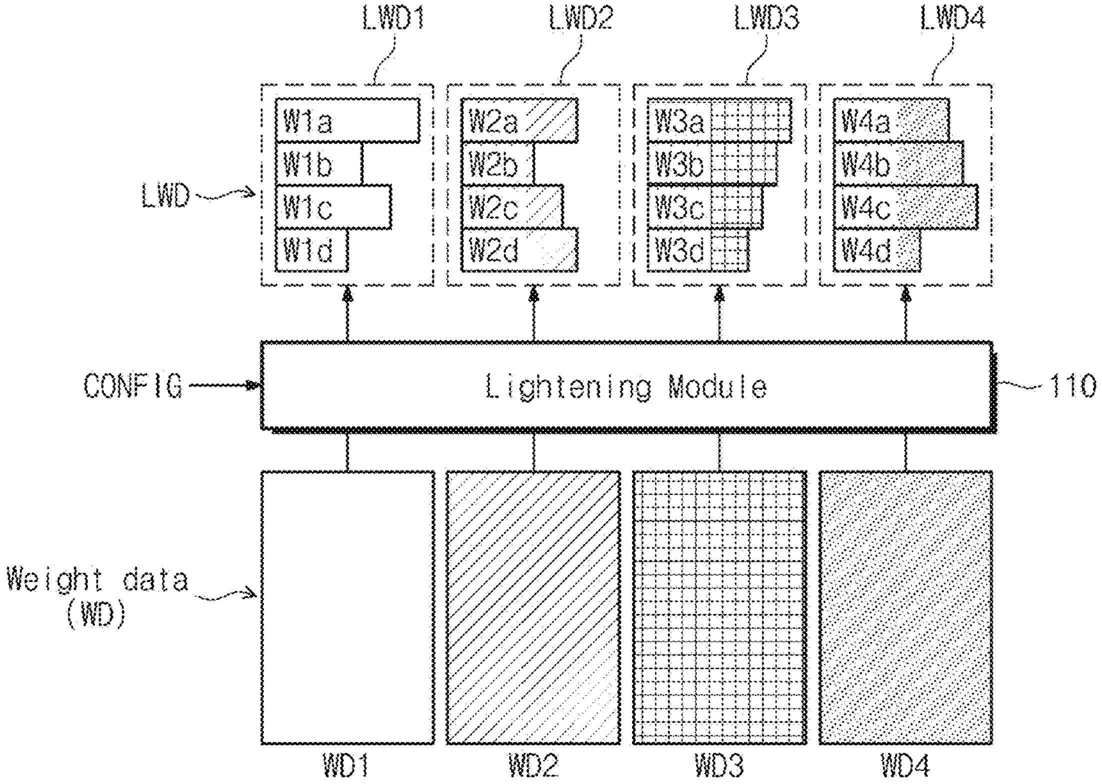
FIG. 4 is a diagram for describing an operation of a lightening module of a host of FIG. 1.

FIG. 4 is a diagram for describing an operation of a lightening module of a host of FIG. 1. Referring to FIGS. 1 and 4, the weight data WD may include first to fourth weight data WD1, WD2, WD3, and WD4. Each of the first to fourth weight data WD1, WD2, WD3, and WD4 may correspond to one weight value. Alternatively, each of the first to fourth weight data WD1, WD2, WD3, and WD4 may include weight values, the number of which is determined in advance. For example, each of the first to fourth weight data WD1, WD2, WD3, and WD4 may include 16 weight values. However, the present disclosure is not limited thereto.

In at least one embodiment, each of the first to fourth weight data WD1, WD2, WD3, and WD4 may include a plurality of weight values included in a corresponding artificial intelligence layer. For example, the artificial intelligence model which is used in the computing device 200 may include a plurality of layers. The plurality of layers may use different weight values. That is, weight values of the plurality of layers may be different from each other, and each of the first to fourth weight data WD1, WD2, WD3, and WD4 may include a plurality of weight values included in the corresponding artificial intelligence layer.

The above description of weight data is to describe embodiments of the present disclosure easily, and the present disclosure is not limited thereto. The number of weight data WD included in the artificial intelligence model may be variously expanded, and weight values included in one weight data may be variously changed and modified.

The lightening module 110 may perform lightening on the weight data WD based on the configuration information CONFIG and may generate the lightening weight data LWD. For example, the configuration information CONFIG may include information about a kind of quantization to be applied to the computing device 200. Based on the information about the kind of quantization included in the configuration information CONFIG, the lightening module 110 may perform lightening on the first weight data WD1 to generate first lightening weight data LWD1, may perform lightening on the second weight data WD2 to generate second lightening weight data LWD2, may perform lightening on the third weight data WD3 to generate third lightening weight data LWD3, and may perform lightening on the fourth weight data WD4 to generate fourth lightening weight data LWD4.

For example, the first lightening weight data LWD1 may include 1*a*-th, 1*b*-th, 1*c*-th, and 1*d*-th weight fragments W1*a*, W1*b*, W1*c*, and W1*d*; the second lightening weight data LWD2 may include 2*a*-th, 2*b*-th, 2*c*-th, and 2*d*-th weight fragments W2*a*, W2*b*, W2*c*, and W2*d*; the third lightening weight data LWD3 may include 3*a*-th, 3*b*-th, 3*c*-th, and 3*d*-th weight fragments W3*a*, W3*b*, W3*c*, and W3*d*; the fourth lightening weight data LW4 may include 4*a*-th, 4*b*-th, 4*c*-th, and 4*d*-th weight fragments W4*a*, W4*b*, W4*c*, and W4*d*; etc.

For example, the information about quantization included in the configuration information CONFIG may indicate 4-bit non-uniform quantization. In this case, the lightening module 110 may perform the 4-bit non-uniform quantization on the first to fourth weight data WD1 to WD4. A result of the 4-bit non-uniform quantization performed for each of the first to fourth weight data WD1 to WD4 may be divided into four unit data. The lightening module 110 may perform compression on the respective unit data to generate the plurality of weight fragments W1*a* to W4*d*. In this case, compression ratios of the unit data may be different from each other. That is, the plurality of weight fragments W1*a* to W4*d* may have different sizes or different lengths.

In at least one embodiment, the accelerator 220 may calculate the first weight data WD1 and/or an approximate value of the first weight data WD1 based on the first lightening weight data LWD1, may calculate the second weight data WD2 and/or an approximate value of the second weight data WD2 based on the second lightening weight data LWD2, may calculate the third weight data WD3 and/or an approximate value of the third weight data WD3 based on the third lightening weight data LWD3, may calculate the fourth weight data WD4 and/or an approximate value of the fourth weight data WD4 based on the fourth lightening weight data LWD4, etc. The accelerator 220 may perform the artificial intelligence computation based on the calculated lightening weight data LWD1 to LWD4. In this case, an appropriate value may, for example, value resulting from a conversion of the first lightening weight data LWD1 that provides a correct result in the artificial intelligence computation.

Figure 5A:
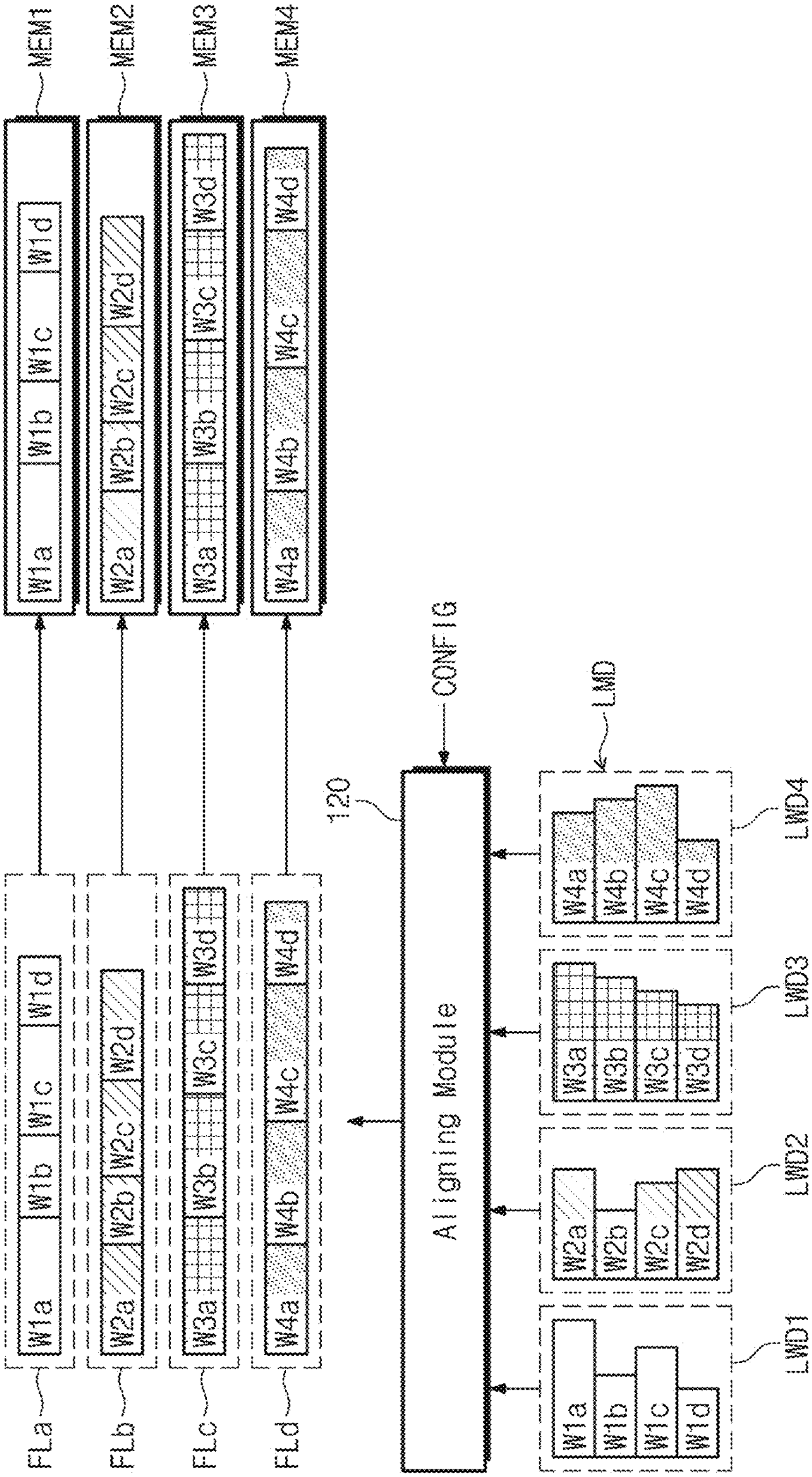
FIGS. 5A and 5B are diagrams for describing an operation of an aligning module of a host of FIG. 1.
Figure 5B:
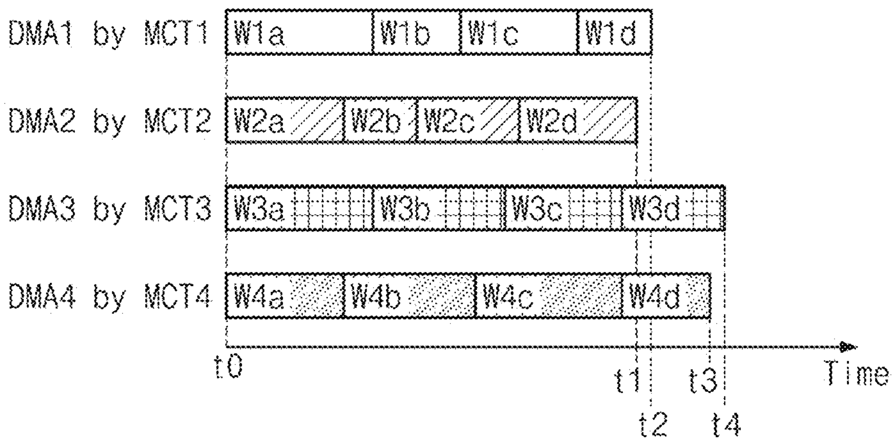

FIGS. 5A and 5B are diagrams for describing an operation of an aligning module of a host of FIG. 1. For convenience of description, the lightening weight data LWD of FIGS. 4, 5A, and 5B are provided as weight data to which the 4-bit non-uniform quantization is applied. However, this is only an example, and the present disclosure is not limited thereto.

Referring to FIGS. 1, 3, 4, 5A, and 5B, the aligning module 120 may generate a plurality of files FLa to FLd by aligning the first to fourth lightening weight data LWD1 to LWD4 based on the configuration information CONFIG. For example, the aligning module 120 may generate the a-th file FLa based on the plurality of weight fragments W1*a* to W1*d* of the first lightening weight data LWD1, may generate the b-th file FLb based on the plurality of weight fragments W2*a* to W2*d* of the second lightening weight data LWD2, may generate the c-th file FLc based on the plurality of weight fragments W3*a* to W3*d* of the third lightening weight data LWD3, and may generate the d-th file FLd based on the plurality of weight fragments W4*a* to W4*d* of the fourth lightening weight data LWD4. That is, the a-th file FLa may include the 1*a*-th to 1*d*-th weight fragments W1*a* to W1*d*, the b-th file FLb may include the 2*a*-th to 2*d*-th weight fragments W2*a* to W2*d*, the c-th file FLc may include the 3*a*-th to 3*d*-th weight fragments W3*a* to W3*d*, and the d-th file FLd may include the 4*a*-th to 4*d*-th weight fragments W4*a* to W4*d*.

Each of the plurality of files FLa to FLd may indicate a unit of data to be loaded into each of the plurality of memories MEM1 to MEM4. For example, the a-th file FLa may be loaded into the first memory MEM1, the b-th file FLb may be loaded into the second memory MEM2, the c-th file FLc may be loaded into the third memory MEM3, and the d-th file FLd may be loaded into the fourth memory MEM4.

The accelerator 220 may access the plurality of files FLa to FLd from the plurality of memories MEM1 to MEM4, may obtain the first to fourth lightening weight data LWD1 to LWD4 based on the plurality of files FLa to FLd, and may perform the artificial intelligence computation.

For example, as illustrated in FIG. 5B, the first memory controller MCT1 may perform a first DMA operation DMA1 on the first memory MEM1 to read out the a-th file Fla; the second memory controller MCT2 may perform a second DMA operation DMA2 on the second memory MEM2 to read out the b-th file FLb; the third memory controller MCT3 may perform a third DMA operation DMA3 on the third memory MEM3 to read out the c-th file FLc; the fourth memory controller MCT4 may perform a fourth DMA operation DMA4 on the fourth memory MEM4 to read out the d-th file FLd; etc.

In this case, the accelerator 220 may sequentially receive the 1*a*-th to 1*d*-th weight fragments W1*a* to W1*d* from the first memory MEM1 through the first DMA operation DMA1 and may generate the first lightening weight data LWD1 at a second point in time t2 when all the 1*a*-th to 1*d*-th weight fragments W1*a* to W1*d* are received. That is, after the second point in time t2, the accelerator 220 may start a computation which uses the first lightening weight data LWD1.

The accelerator 220 may sequentially receive the 2*a*-th to 2*d*-th weight fragments W2*a* to W2*d* from the second memory MEM2 through the second DMA operation DMA2 and may generate the second lightening weight data LWD2 at a first point in time t1 when all the 2*a*-th to 2*d*-th weight fragments W2*a* to W2*d* are received. That is, after the first point in time t1, the accelerator 220 may start a computation which uses the second lightening weight data LWD2.

Likewise, the accelerator 220 may sequentially receive the 3*a*-th to 3*d*-th weight fragments W3*a* to W3*d* from the third memory MEM3 through the third DMA operation DMA3 and may sequentially receive the 4*a*-th to 4*d*-th weight fragments W4*a* to W4*d* from the fourth memory MEM4 through the fourth DMA operation DMA4. At a third point in time t3, the accelerator 220 may generate the third lightening weight data LWD3 and may then perform a corresponding computation; at a fourth point in time t4, the accelerator 220 may generate the fourth lightening weight data LWD4 and may then perform a corresponding computation.

As described above, as the lightening weight data LWD1, LWD2, LWD3, and LWD4 are distributed and stored in the plurality of memories MEM1, MEM2, MEM3, and MEM4, the accelerator 220 may receive the lightening weight data LWD1, LWD2, LWD3, and LWD4 through individual DMA operations on the plurality of memories MEM1, MEM2, MEM3, and MEM4.

Figure 6A:
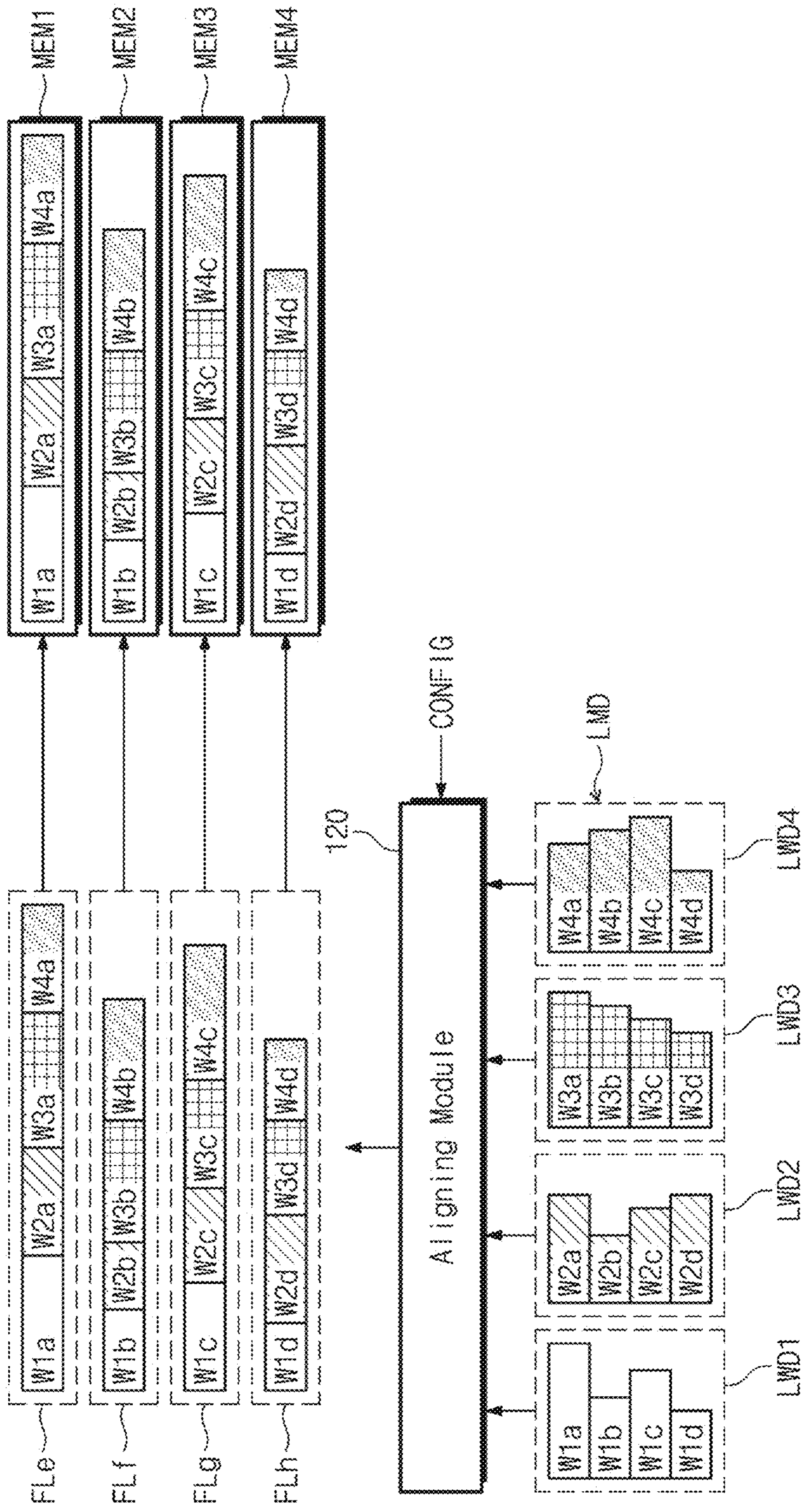
FIGS. 6A and 6B are diagrams for describing an operation of an aligning module of a host of FIG. 1.
Figure 6B:
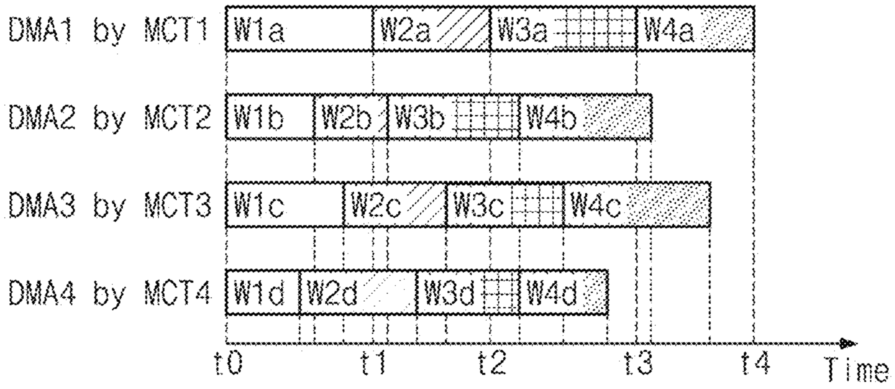

FIGS. 6A and 6B are diagrams for describing an operation of an aligning module of a host of FIG. 1. For convenience of description, additional description associated with the components described above will be omitted to avoid redundancy. Referring to FIGS. 1, 2, 4, 6A, and 6B, the aligning module 120 may align the lightening weight data LWD to generate a plurality of files FLe, FLf, FLg, and FLh.

In the example of FIG. 5A, compression data of the same lightening weight data are included in the same file. For example, the weight fragments W1*a*, W1*b*, W1*c*, and W1*d* of the first lightening weight data LWD1 are included in the same a-th file FLa. In contrast, in the example of FIG. 6A, weight fragments of the same lightening weight data may be included in different files. For example, the weight fragments W1*a*, W1*b*, Wc, and W1*d* of the first lightening weight data LWD1 may be respectively included in e-th to h-th files FLe to FLh; the weight fragments W2*a*, W2*b*, W2*c*, and W2*d* of the second lightening weight data LWD2 may be respectively included in the e-th to h-th files FLe to FLh; the weight fragments W3*a*, W3*b*, W3*c*, and W3*d* of the third lightening weight data LWD3 may be respectively included in the e-th to h-th files FLe to FLh; the weight fragments W4*a*, W4*b*, W4*c*, and W4*d* of the fourth lightening weight data LWD4 may be respectively included in the e-th to h-th files FLe to FLh; etc.

In this case, the e-th file FLe may include the 1*a*-th, 2*a*-th, 3*a*-th, and 4*a*-th weight fragments W1*a*, W2*a*, W3*a*, and W4*a*, the f-th file FLf may include the 1*b*-th, 2*b*-th, 3*b*-th, and 4*b*-th weight fragments W1*b*, W2*b*, W3*b*, and W4*b*, the g-th file FLg may include the 1*c*-th, 2*c*-th, 3*c*-th, and 4*c*-th weight fragments W1*c*, W2*c*, W3*c*, and W4*c*, and the h-th file FLh may include the 1*d*-th, 2*d*-th, 3*d*-th, and 4*d*-th weight fragments W1*d*, W2*d*, W3*d*, and W4*d*. The e-th to h-th files FLe to FLh may be respectively stored in the first to fourth memories MEM1 to MEM4.

In at least one embodiment, as compression data of the same lightening weight data are respectively stored in different files, a point in time when the artificial intelligence computation of the accelerator 220 starts may be advanced. For example, as illustrated in FIG. 6B, the accelerator 220 may read out the e-th to h-th files FLe to FLh from the first to fourth memories MEM1 to MEM4 in parallel.

For example, the first memory controller MCT1 may sequentially read out the weight fragments W1*a*, W2*a*, W3*a*, and W4*a* of the e-th file FLe from the first memory MEM1 through the first DMA operation DMA1. The second memory controller MCT2 may sequentially read out the weight fragments W1*b*, W2*b*, W3*b*, and W4*b* of the h-th file FLh from the second memory MEM2 through the second DMA operation DMA2. The third memory controller MCT3 may sequentially read out the weight fragments W1*c*, W2*c*, W3*c*, and W4*c* of the f-th file FLf from the third memory MEM3 through the third DMA operation DMA3. The fourth memory controller MCT4 may sequentially read out the weight fragments W1*d*, W2*d*, W3*d*, and W4*d* of the g-th file FLg from the fourth memory MEM4 through the fourth DMA operation DMA4.

In this case, at a first point in time t1 when all the weight fragments W1*a*, W1*b*, W1*c*, and W1*d* corresponding to the first lightening weight data LWD1 are received, the accelerator 220 may obtain the first lightening weight data LWD1 based on the weight fragments W1*a*, W1*b*, W1*c*, and W1*d* and may start the artificial intelligence computation on the first lightening weight data LWD1. Next, at a second point in time t2 when all the weight fragments W2*a*, W2*b*, W2*c*, and W2*d* corresponding to the second lightening weight data LWD2 are received, the accelerator 220 may obtain the second lightening weight data LWD2 based on the weight fragments W2*a*, W2*b*, W2*c*, and W2*d* and may start the artificial intelligence computation on the second lightening weight data LWD2. Then, at a third point in time t3 when all the weight fragments W3*a*, W3*b*, W3*c*, and W3*d* corresponding to the third lightening weight data LWD3 are received, the accelerator 220 may obtain the third lightening weight data LWD3 based on the weight fragments W3*a*, W3*b*, W3*c*, and W3*d* and may start the artificial intelligence computation on the third lightening weight data LWD3. Finally, at a fourth point in time t4 when all the weight fragments W4*a*, W4*b*, W4*c*, and W4*d* corresponding to the fourth lightening weight data LWD4 are received, the accelerator 220 may obtain the fourth lightening weight data LWD4 based on the weight fragments W4*a*, W4*b*, W4*c*, and W4*d* and may start the artificial intelligence computation on the fourth lightening weight data LWD4.

As described above, the aligning module 120 may perform the aligning operation based on the configuration information CONFIG of the computing device 200 such that weight fragments of the lightening weight data LWD are distributed and included in a plurality of files. In this case, the accelerator 220 of the computing device 200 may access a plurality of files from the plurality of memories MEM1 to MEM4 in parallel and may obtain lightening weight data based on the plurality of files accessed in parallel.

Figure 7A:
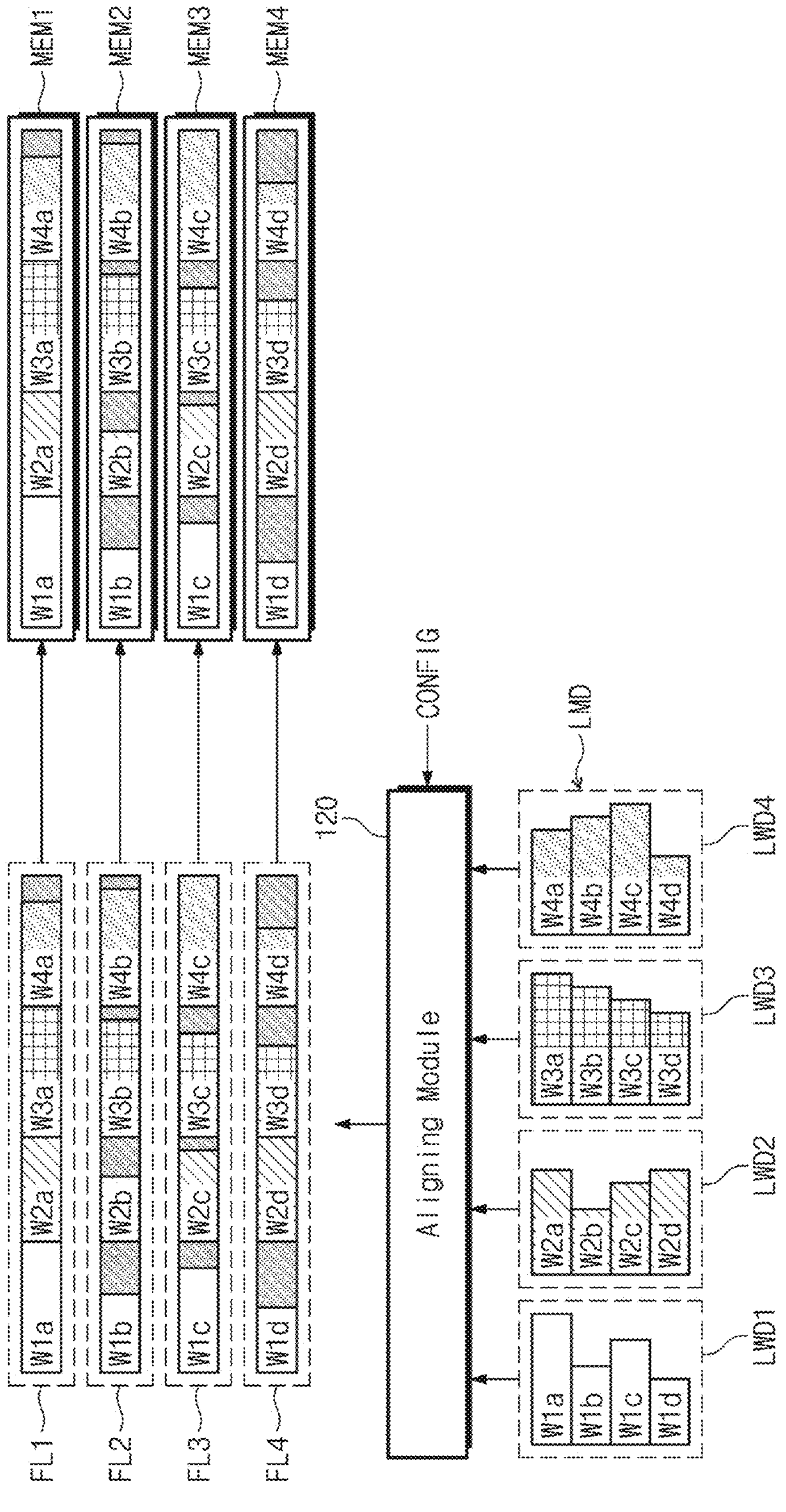
FIGS. 7A and 7B are diagrams for describing an operation of an aligning module of a host of FIG. 1.
Figure 7B:
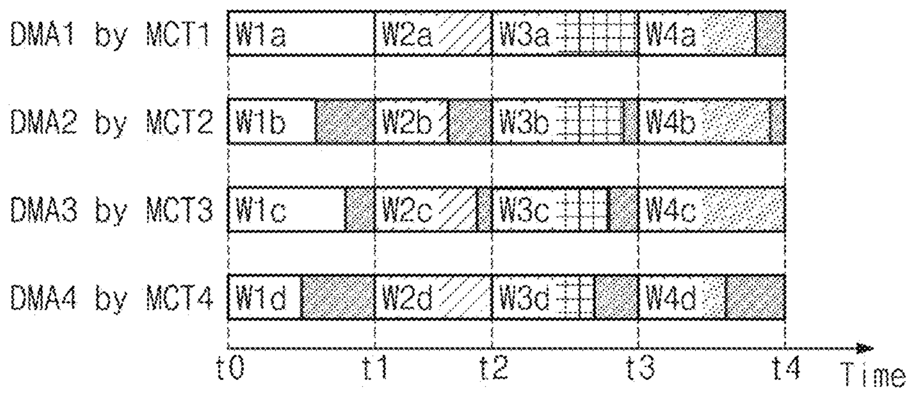

FIGS. 7A and 7B are diagrams for describing an operation of an aligning module of a host of FIG. 1. For convenience of description, additional description associated with the components described above will be omitted to avoid redundancy. Referring to FIGS. 1, 2, 4, 7A, and 7B, the aligning module 120 may align the lightening weight data LWD to generate a plurality of files FL1, FL2, FL3, and FL4.

In the embodiment of FIG. 7A, weight fragments of the same lightening weight data are included in different files. For example, the weight fragments W1*a*, W1*b*, W1*c*, and W1*d* of the first lightening weight data LWD1 may be respectively included in the first to fourth files FL1 to FL4; the weight fragments W2*a*, W2*b*, W2*c*, and W2*d* of the second lightening weight data LWD2 may be respectively included in the first to fourth files FL1 to FL4; the weight fragments W3*a*, W3*b*, W3*c*, and W3*d* of the third lightening weight data LWD3 may be respectively included in the first to fourth files FL1 to FL4. The weight fragments W4*a*, W4*b*, W4*c*, and W4*d* of the fourth lightening weight data LWD4 may be respectively included in the first to fourth files FL1 to FL4; etc.

In this case, the first file FL1 may include the weight fragments W1*a*, W2*a*, W3*a*, and W4*a*, the second file FL2 may include the weight fragments W1*b*, W2*b*, W3*b*, and W4*b*, the third file FL3 may include the weight fragments W1*c*, W2*c*, W3*c*, and W4*c*, and the fourth file FL4 may include the weight fragments W1*d*, W2*d*, W3*d*, and W4*d*.

In the embodiment of FIG. 7A, the aligning module 120 may add padding data such that weight fragments included in the first to fourth files FL1 to FL4 have the same length.

For example, in the embodiment of FIGS. 6A and 6B, because weight fragments included in the plurality of files FLe to FLh have different lengths, individual DMA setting is required for each of the first to fourth memory controllers MCT1 to MCT4. In at least one embodiment, the DMA setting may be performed by a separate DMA controller included in the computing device 200.

For example, for the first to fourth memory controllers MCT1 to MCT4 to perform the DMA operations, the setting of DMA start addresses, offsets, etc. is required. In this case, in the example of FIGS. 6A and 6B, when the first memory controller MCT1 accesses the 2*a*-th weight fragment W2*a* from the first memory MEM1, a first start address, a first offset, etc. for the 2*a*-th weight fragment W2*a* are set in the first memory controller MCT1. Also, when the second memory controller MCT2 accesses the 2*b*-th weight fragment W2*b* from the second memory MEM2, a second start address, a second offset, etc. for the 2*b*-th weight fragment W2*b* are set in the second memory controller MCT2. In this case, as illustrated in FIGS. 6A and 6B, the size of the weight fragment included in the e-th file Fle is different from the size of the weight fragment included in the f-th file FLf, the first and second start addresses may be different from each other, and the first and second offsets may be different from each other. Also, a point in time when the first memory controller MCT1 accesses the 2*a*-th weight fragment W2*a* may be different from a point in time when the second memory controller MCT2 accesses the 2*b*-th weight fragment W2*b*. In this case, the DMA setting should be performed for each of the first memory controller MCT1 and the second memory controller MCT2, which causes the increase in complexity of the computing device 200.

In contrast, according to the embodiment of FIGS. 7A and 7B, the aligning module 120 may add padding data such that weight fragments included in the first to fourth files FL1 to FL4 have the same length. For example, the aligning module 120 may add padding data to the weight fragments W1*a* to W4*d* of the first to fourth lightening weight data LWD1 to LWD4 such that the weight fragments W1*a* to W4*d* of the first to fourth lightening weight data LWD1 to LWD4 are stored at the same address in the plurality of memories MEM1 to MEM4.

In detail, as illustrated in FIG. 7A, the first file FL1 may include the 1*a*-th and 2*a*-th weight fragments W1*a* and W2*a*, the second file FL2 may include the 1*b*-th and 2*b*-th weight fragments W1*b* and W2*b*, the third file FL3 may include the 1*c*-th and 2*c*-th weight fragments W1*c* and W2*c*, and the fourth file FL4 may include the 1*d*-th and 2*d*-th weight fragments W1*d* and W2*d*.

In this case, the aligning module 120 may add padding data to the remaining weight fragments W1*b*, W1*c*, and W1*d* based on the first 1*a*-th weight fragment W1*a* having the largest size or the longest length from among the 1*a*-th, 1*b*-th, 1*c*-th, and 1*d*-th weight fragments W1*a*, W1*b*, W1*c*, and W1*d*.

Likewise, the first file FL1 may further include the 3*a*-th and 4*a*-th weight fragments W3*a* and W4*a*, the second file FL2 may further include the 3*b*-th and 4*b*-th weight fragments W3*b* and W4*b*, the third file FL3 may further include the 3*c*-th and 4*c*-th weight fragments W3*c* and W4*c*, and the fourth file FL4 may further include the 3*d*-th and 4*d*-th weight fragments W3*d* and W4*d*. The aligning module 120 may add padding data to the remaining weight fragments W2*b* and W2*c* based on the 2*a*-th or 2*d*-th weight fragments W2*a* or W2*d* having the largest size or the longest length from among the 2*a*-th, 2*b*-th, 2*c*-th, and 2*d*-th weight fragments W2*a*, W2*b*, W2*c*, and W2*d*, may add padding data to the remaining weight fragments W3*b*, W3*c*, and W3*d* based on the 3*a*-th weight fragment W3*a* having the largest size or the longest length from among the 3*a*-th, 3*b*-th, 3*c*-th, and 3*d*-th weight fragments W3*a*, W3*b*, W3*c*, and W3*d*, and may add padding data to the remaining weight fragments W4*a*, W4*b*, and W4*d* based on the 4*c*-th weight fragment W4*c* having the largest size or the longest length from among the 4*a*-th, 4*b*-th, 4*c*-th, and 4*d*-th weight fragments W4*a*, W4*b*, W4*c*, and W4*d*.

In this case, the first to fourth files FL1 to FL4 may be aligned as illustrated in FIG. 7A, and the first to fourth files FL1 to FL4 may be respectively loaded into the first to fourth memories MEM1 to MEM4.

The first to fourth files FL1 to FL4 may be generated by aligning the lightening weight data LWD as illustrated in FIG. 7A. In this case, the DMA setting of the accelerator 220 associated with the first to fourth memory controllers MCT1 to MCT4 may be simplified.

For example, the weight fragments W1*a*, W1*b*, W1*c*, and W1*d* corresponding to the first lightening weight data LWD1 may be respectively read out from the first to fourth memories MEM1 to MEM4 by the first to fourth memory controllers MCT1 to MCT4. In this case, as padding data are added to some of the weight fragments W1*a*, W1*b*, W1*c*, and W1*d*, the weight fragments W1*a*, W1*b*, W1*c*, and W1*d* may have the same offsets. Accordingly, the same first start addresses and the same first offsets may be set in the first to fourth memory controllers MCT1 to MCT4, and thus, the weight fragments W1*a*, W1*b*, W1*c*, and W1*d* may be read out from the first to fourth memories MEM1 to MEM4 during a time interval from to to t1.

The weight fragments W2*a*, W2*b*, W2*c*, and W2*d* corresponding to the second lightening weight data LWD2 may be respectively read out from the first to fourth memories MEM1 to MEM4 by the first to fourth memory controllers MCT1 to MCT4. In this case, as padding data are added to some of the weight fragments W2*a*, W2*b*, W2*c*, and W2*d*, the weight fragments W2*a*, W2*b*, W2*c*, and W2*d* may have the same offsets. Also, because the offsets corresponding to the previous weight fragments W1*a*, W1*b*, W1*c*, and W1*d* are identical to each other, start addresses of the weight fragments W2*a*, W2*b*, W2*c*, and W2*d* may be identical to each other. Accordingly, the same second start addresses and the same second offsets may be set in the first to fourth memory controllers MCT1 to MCT4, and thus, the weight fragments W2*a*, W2*b*, W2*c*, and W2*d* may be read out from the first to fourth memories MEM1 to MEM4 during a time interval from t1 to t2.

The weight fragments W3*a*, W3*b*, W3*c*, and W3*d* corresponding to the third lightening weight data LWD3 may be respectively read out from the first to fourth memories MEM1 to MEM4 by the first to fourth memory controllers MCT1 to MCT4. In this case, as padding data are added to some of the weight fragments W3*a*, W3*b*, W3*c*, and W3*d*, the weight fragments W3*a*, W3*b*, W3*c*, and W3*d* may have the same offsets. Also, because the offsets corresponding to the previous weight fragments W2*a*, W2*b*, W2*c*, and W2*d* are identical to each other, start addresses of the weight fragments W3*a*, W3*b*, W3*c*, and W3*d* may be identical to each other. Accordingly, the same third start addresses and the same third offsets may be set in the first to fourth memory controllers MCT1 to MCT4, and thus, the weight fragments W3*a*, W3*b*, W3*c*, and W3*d* may be read out from the first to fourth memories MEM1 to MEM4 during a time interval from t2 to t3.

Likewise, the weight fragments W4*a*, W4*b*, W4*c*, and W4*d* corresponding to the fourth lightening weight data LWD4 may be respectively read out from the first to fourth memories MEM1 to MEM4 by the first to fourth memory controllers MCT1 to MCT4. In this case, as padding data are added to some of the weight fragments W4*a*, W4*b*, W4*c*, and W4*d*, the weight fragments W4*a*, W4*b*, W4*c*, and W4*d* may have the same offsets. Also, because the offsets corresponding to the previous weight fragments W3*a*, W3*b*, W3*c*, and W3*d* are identical to each other, start addresses of the weight fragments W4*a*, W4*b*, W4*c*, and W4*d* may be identical to each other. Accordingly, the same fourth start addresses and the same fourth offsets may be set in the first to fourth memory controllers MCT1 to MCT4, and thus, the weight fragments W4*a*, W4*b*, W4*c*, and W4*d* may be read out from the first to fourth memories MEM1 to MEM4 during a time interval from t3 to t4.

As described above, according to at least one embodiment of the present disclosure, the aligning module 120 of the host 100 may generate the lightening weight file FILE_LWD by aligning the lightening weight data LWD based on the configuration information CONFIG of the computing device 200. In this case, in the same DMA period, the aligning module 120 may add padding data to weight fragments such that data to be respectively accessed from the plurality of memories MEM1 to MEM4 have the same lengths. Accordingly, the first to fourth memory controllers MCT1 to MCT4 of the accelerator 220 may normally read out the weight fragments W1*a* to W1*d* from the first to fourth memories MEM1 to MEM4 by using the same start addresses and the same offsets.

In at least one embodiment, the accelerator 220 may further include a separate device and/or structure for removing the padding data read out from the first to fourth memories MEM1 to MEM4.

Below, for convenience of description, the term "DMA period" is used. The DMA period indicates a period of a DMA operation which is performed by a memory controller through one setting for a start address and an offset. For example, in the embodiment of FIG. 7B, an A-th DMA period may indicate a period from t0 to t1. That is, in the A-th DMA period, the first memory controller MCT1 may read out the 1*a*-th weight fragment W1*a* from the first memory MEM1, the second memory controller MCT2 may read out the 1*b*-th weight fragment W1*b* from the second memory MEM2, the third memory controller MCT3 may read out the 1*c*-th weight fragment Wc from the third memory MEM3, and the fourth memory controller MCT4 may read out the 1*d*-th weight fragment W1*d* from the fourth memory MEM4. A B-th DMA period may be a time period from a time interval from t1 to t2. That is, in the B-th DMA period, the first memory controller MCT1 may read out the 2*a*-th weight fragment W2*a* from the first memory MEM1, the second memory controller MCT2 may read out the 2*b*-th weight fragment W2*b* from the second memory MEM2, the third memory controller MCT3 may read out the 2*c*-th weight fragment W2*c* from the third memory MEM3, and the fourth memory controller MCT4 may read out the 2*d*-th weight fragment W2*d* from the fourth memory MEM4.

As described above, the aligning module 120 may add padding data to weight fragments such that data to be respectively read out from the first to fourth memories MEM1 to MEM4 in the same DMA period have the same sizes. Accordingly, the performance of the computing device 200 is improved.

Figure 8:
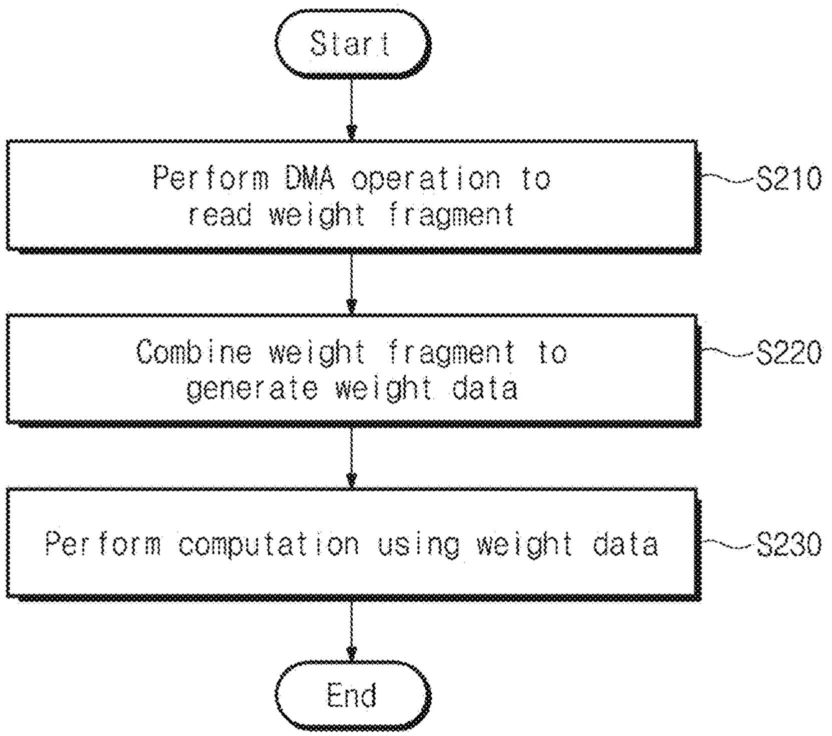
FIG. 8 is a flowchart illustrating an operation of a computing device of FIG. 1.

FIG. 8 is a flowchart illustrating an operation of a computing device of FIG. 1. Referring to FIGS. 1 and 8, in operation S210, the computing device 200 may perform the DMA operation to read out weight fragments. For example, based on the method described with reference to FIGS. 1 to 7B, the host 100 may generate a plurality of files and may load the plurality of files thus generated into the plurality of memories MEM1 to MEM4 of the memory device 210. The accelerator 220 of the computing device 200 may perform the DMA operation on each of the plurality of memories MEM1 to MEM4 to read out weight fragments from the plurality of memories MEM1 to MEM4.

In operation S220, the computing device 200 may combine the weight fragments to generate weight data, lightening weight data, and/or approximate weight data. For example, as described with reference to FIGS. 1 to 7B, the first to fourth memory controllers MCT1 to MCT4 of the accelerator 220 may perform the DMA operations on the first to fourth memories MEM1 to MEM4 to read out weight fragments (e.g., W1*a* to W4*d*). The weight fragments (e.g., W1*a* to W4*d*) may be temporarily stored in the internal buffer 221 of the accelerator 220. The accelerator 220 may generate the lightening weight data LWD1 to LWD4 based on the temporarily stored weight fragments (e.g., W1*a* to W4*d*) in the internal buffer 221.

For example, the accelerator 220 may combine the 1*a*-th, 1*b*-th, 1*c*-th, and 1*d*-th weight fragments W1*a*, W1*b*, W1*c*, and W1*d* to generate the first lightening weight data LWD1, may combine the 2*a*-th, 2*b*-th, 2*c*-th, and 2*d*-th weight fragments W2*a*, W2*b*, W2*c*, and W2*d* to generate the second lightening weight data LWD2, may combine the 3*a*-th, 3*b*-th, 3*c*-th, and 3*d*-th weight fragments W3*a*, W3*b*, W3*c*, and W3*d* to generate the third lightening weight data LWD3, may combine the 4*a*-th, 4*b*-th, 4*c*-th, and 4*d*-th weight fragments W4*a*, W4*b*, W4*c*, and W4*d* to generate the fourth lightening weight data LWD4.

In operation S230, the computing device 200 may perform the artificial intelligence computation by using the weight data. For example, the computing device 200 may perform the MAC operation by using the weight data. In at least one embodiment, a computational result of the computing device 200 may be again stored in the memory device 210.

Figure 9:
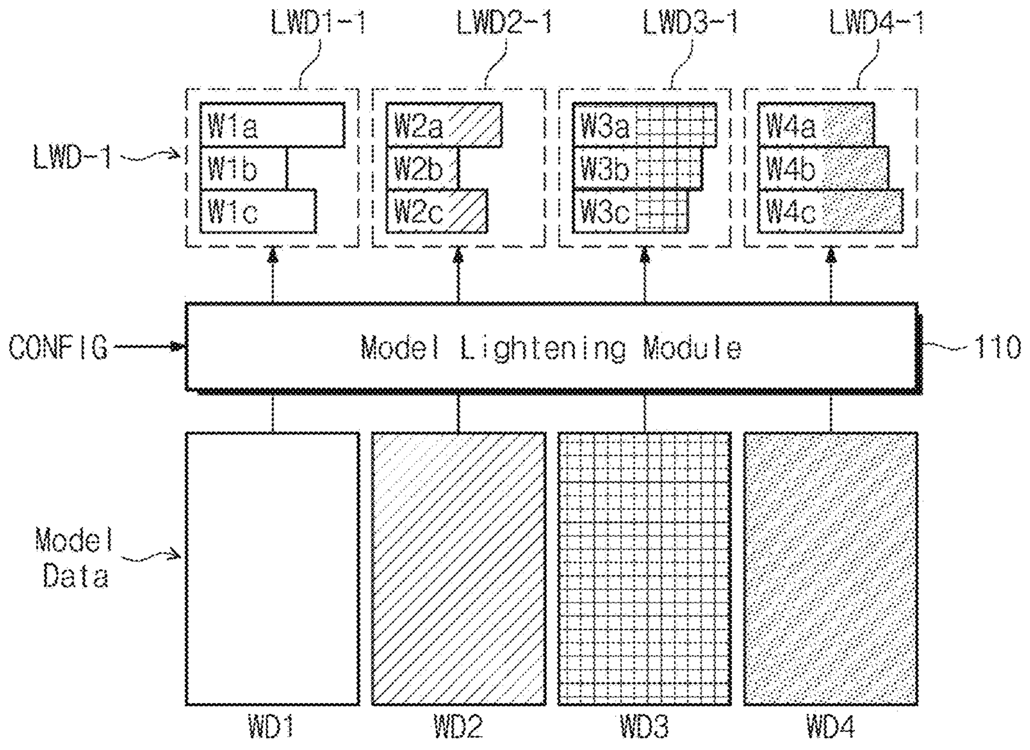
FIG. 9 is a diagram for describing an operation of a lightening module of a host of FIG. 1.

FIG. 9 is a diagram for describing an operation of a lightening module of a host of FIG. 1. Referring to FIGS. 1 and 9, the weight data WD may include the first to fourth weight data WD1, WD2, WD3, and WD4. The weight data WD is described with reference to FIG. 4. In other words, the weight data WD of FIG. 9 may be the same as and/or substantially similar to the weight data WD of FIG. 4, thus, additional description will be omitted to avoid redundancy.

The lightening module 110 may perform lightening on the weight data WD based on the configuration information CONFIG and may generate lightening weight data LWD-1. For example, the configuration information CONFIG may include information about a kind of quantization to be applied to the computing device 200. Based on the information about the kind of quantization included in the configuration information CONFIG, the lightening module 110 may perform lightening on the first weight data WD1 to generate first lightening weight data LWD1-1, may perform lightening on the second weight data WD2 to generate second lightening weight data LWD2-1, may perform lightening on the third weight data WD3 to generate third lightening weight data LWD3-1, and may perform lightening on the fourth weight data WD4 to generate fourth lightening weight data LWD4-1. For example, the information about quantization included in the configuration information CONFIG may indicate 3-bit non-uniform quantization. In this case, the lightening module 110 may perform the 3-bit non-uniform quantization on the first to fourth weight data WD1 to WD4. A result of the 3-bit non-uniform quantization performed for each of the first to fourth weight data WD1 to WD4 may be divided into three data chucks. The lightening module 110 may perform compression on the respective data chucks to generate the plurality of weight fragments W1*a* to W4*c*. In this case, compression ratios of the data chucks may be different from each other. That is, the plurality of weight fragments W1*a* to W4*c* may have different sizes and/or different lengths.

In at least one embodiment, the first lightening weight data LWD1-1 may include the 1*a*-th, 1*b*-th, and 1*c*-th weight fragments W1*a*, W1*b*, and W1*c*; the second lightening weight data LWD2-1 may include the 2*a*-th, 2*b*-th, and 2*c*-th weight fragments W2*a*, W2*b*, and W2*c*; the third lightening weight data LWD3-1 may include the 3*a*-th, 3*b*-th, and 3*c*-th weight fragments W3*a*, W3*b*, and W3*c*; and the fourth lightening weight data LWD4-1 may include the 4*a*-th, 4*b*-th, and 4*c*-th weight fragments W4*a*, W4*b*, and W4*c*.

Figure 10A:
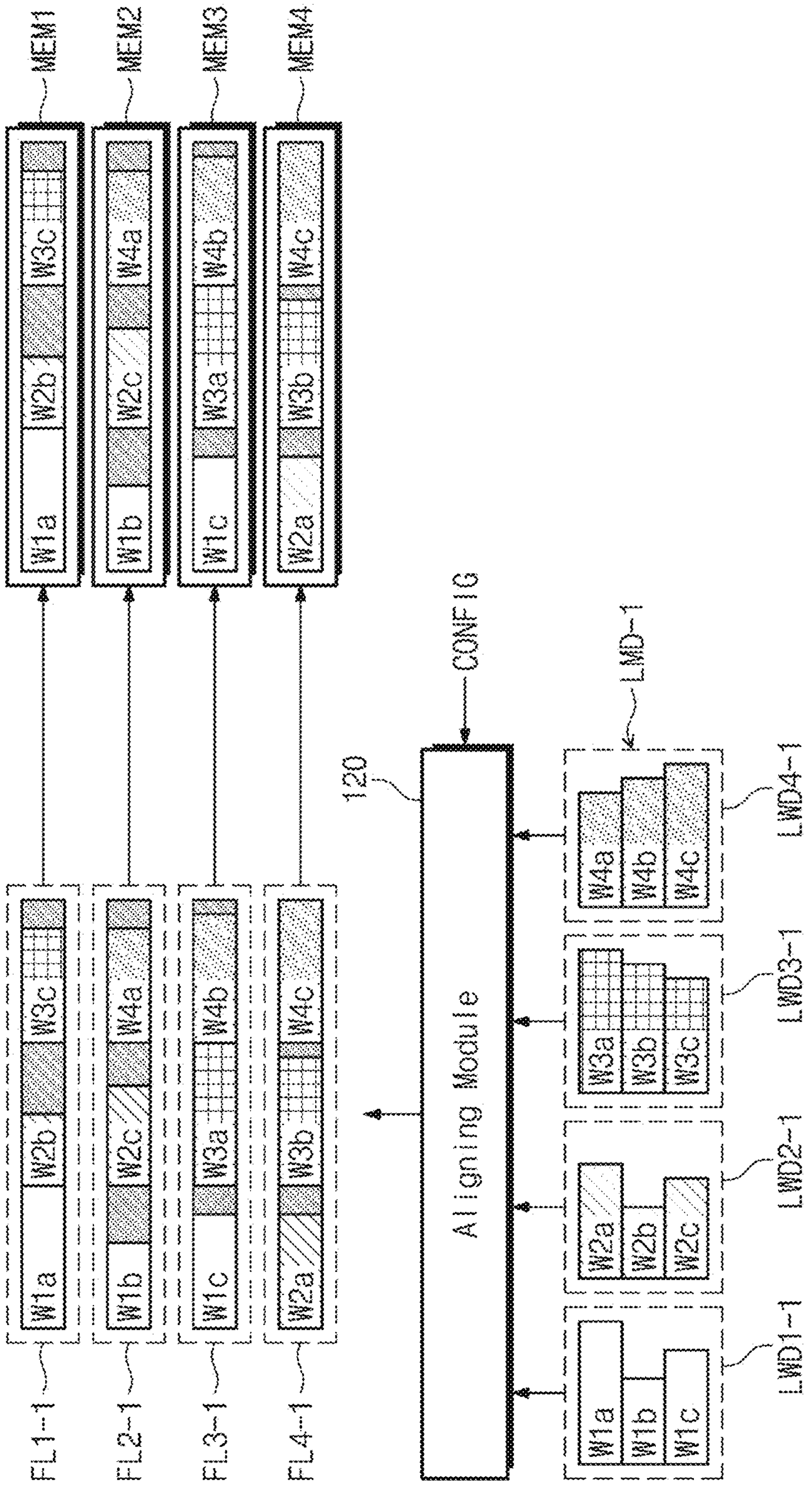
FIGS. 10A and 10B are diagrams for describing an operation of an aligning module of a host of FIG. 1.
Figure 10B:
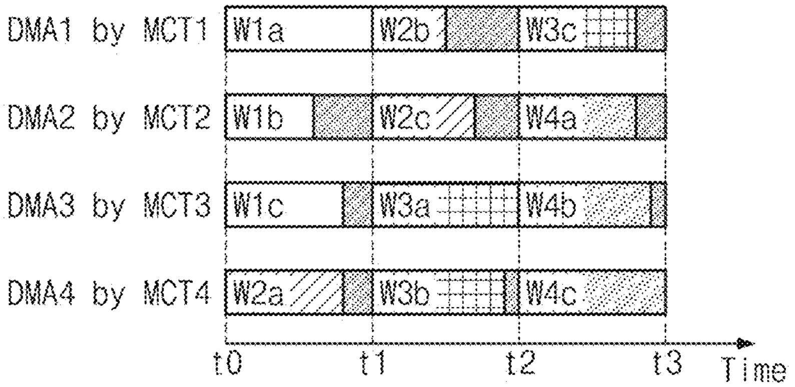

FIGS. 10A and 10B are diagrams for describing an operation of an aligning module of a host of FIG. 1. For convenience of description, the lightening weight data LWD-1 of FIGS. 9, 10A, and 10B are provided as the weight data to which the 3-bit non-uniform quantization is applied. However, this is only an example, and the present disclosure is not limited thereto.

Referring to FIGS. 1, 3, 9, 10A, and 10B, the aligning module 120 may generate a plurality of files FL1-1 to FL4-1 by aligning the first to fourth lightening weight data LWD1-1 to LWD4-1 based on the configuration information CONFIG.

For example, the configuration information CONFIG may include information about four channels CH1 to CH4 between the memory device 210 and the accelerator 220 of the computing device 200. The aligning module 120 may generate the four files FL1-1 to FL4-1 based on the configuration information CONFIG (i.e., information of the four channels CH1 to CH4). In this case, the aligning module 120 may distribute the weight fragments W1*a* to W4*c* of the first to fourth lightening weight data LWD1-1 to LWD4-1 into the four files FL1-1 to FL4-1. The four files FL1-1 to FL4-1 may be respectively loaded into the first to fourth memories MEM1 to MEM4.

In at least one embodiment, the first lightening weight data LWD1-1 may include the three weight fragments W1*a* to W1*c*, the second lightening weight data LWD1-2 may include the three weight fragments W2*a* to W2*c*, the third lightening weight data LWD1-3 may include the three weight fragments W3*a* to W3*c*, and the fourth lightening weight data LWD4-1 may include the three weight fragments W4*a* to W4*c*. That is, the number of weight fragments may be 12; in this case, each of the first to fourth files FL1-1 to FL4-1 may include three weight fragments. For example, the first file FL1-1 may include the 1*a*-th, 2*b*-th, and 3*c*-th weight fragments W1*a*, W2*b*, and W3*c*, the second file FL2-1 may include the 1*b*-th, 2*c*-th, and 4*a*-th weight fragments W1*b*, W2*c*, and W4*a*, the third file FL3-1 may include the 1*c*-th, 3*a*-th, and 4*b*-th weight fragments W1*c*, W3*a*, and W4*b*, and the fourth file FL4-1 may include 2*a*-th, 3*b*-th, and 4*c*-th weight fragments W2*a*, W3*b*, and W4*c*.

In at least one embodiment, padding data may be added to weight fragments included in each of the first to fourth files FL1-1 to FL4-1, based on the method described with reference to FIGS. 7A and 7B. For example, in the weight fragments W1*a* to W4*c* included in the first to fourth files FL1-1 to FL4-1, based on the 1*a*-th weight fragment W1*a* having the longest length or the largest size from among the 1*a*-th, 1*b*-th, 1*c*-th, and 2*a*-th weight fragments W1*a*, W1*b*, W1*c*, and W2*a* to be accessed during the A-th DMA period, padding data may be added to the remaining weight fragments W1*b*, W1*c*, and W2*a*. Accordingly, the 1*a*-th, 1*b*-th, 1*c*-th, and 2*a*-th weight fragments W1*a*, W1*b*, W1*c*, and W2*a* to be accessed during the A-th DMA period may have the same sizes.

The first to fourth memory controllers MCT1 to MCT4 of the accelerator 220 may perform the DMA operations on the first to fourth memories MEM1 to MEM4 to access the weight fragments W1*a* to W4*c*. For example, during the A-th DMA period from t0 to t1, the accelerator 220 may read out the 1*a*-th, 1*b*-th, 1*c*-th, and 2*a*-th weight fragments W1*a*, W1*b*, W1*c*, and W2*a* from the first to fourth memories MEM1 to MEM4. During the B-th DMA period from t1 to t2, the accelerator 220 may read out the 2*b*-th, 2*c*-th, 3*a*-th, and 3*b*-th weight fragments W2*b*, W2*c*, W3*a*, and W3*b* from the first to fourth memories MEM1 to MEM4. During the C-th DMA period from t2 to t3, the accelerator 220 may read out the 3*c*-th, 4*a*-th, 4*b*-th, and 4*c*-th weight fragments W3*c*, W4*a*, W4*b*, and W4*c* from the first to fourth memories MEM1 to MEM4.

Figure 11A:
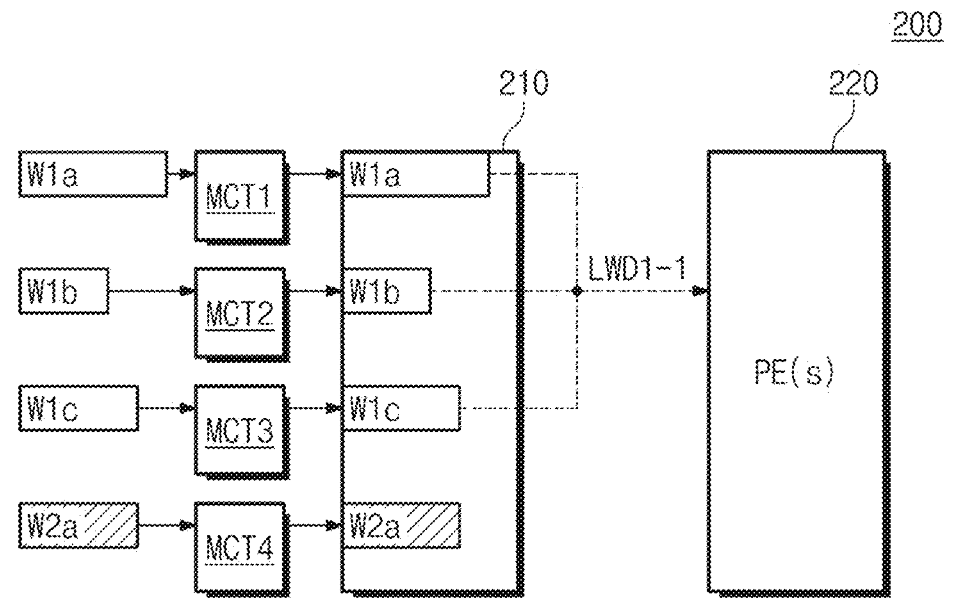
FIGS. 11A to 11C are diagrams for describing a method of reading out a plurality of files described with reference to FIGS. 10A and 10B.
Figure 11B:
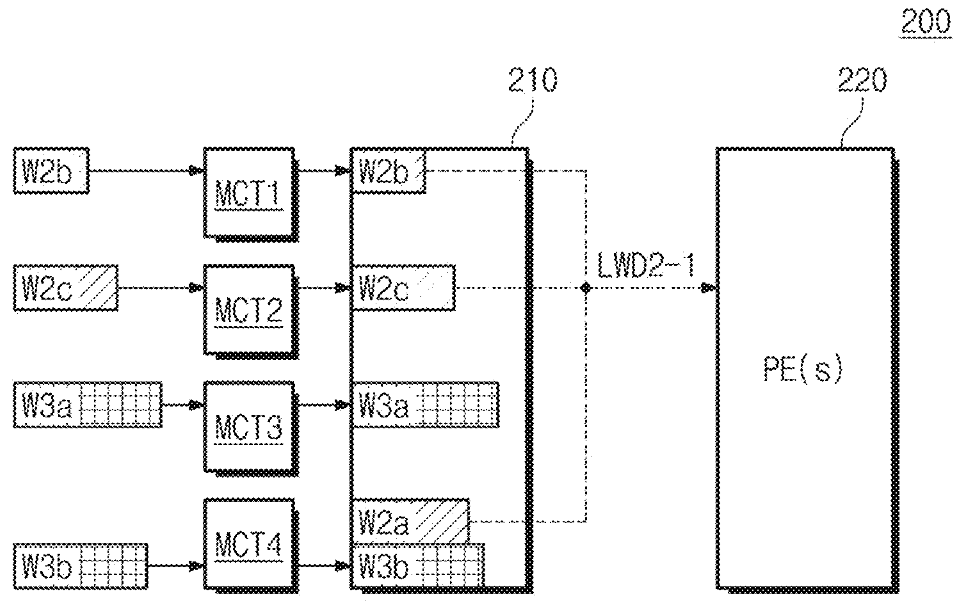
Figure 11C:
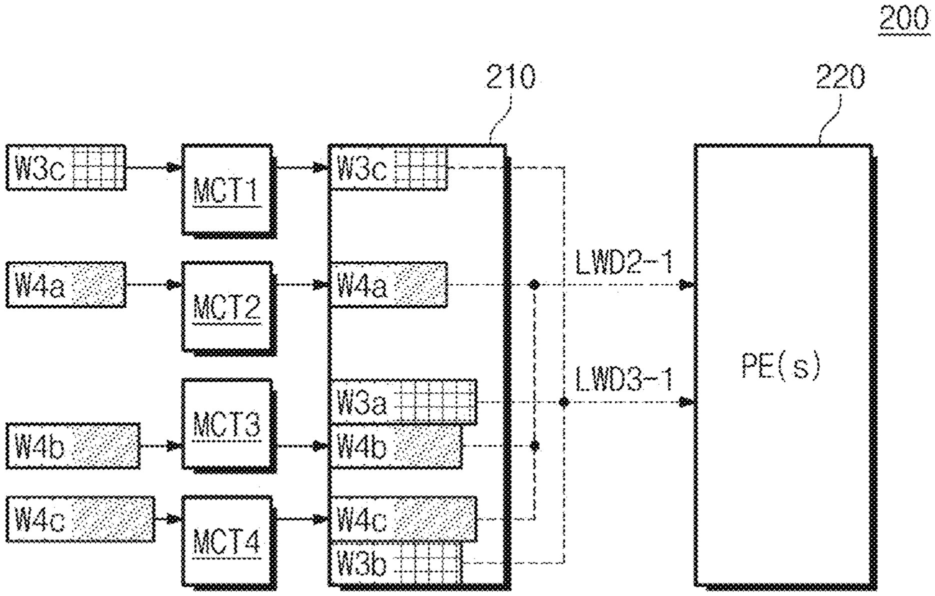

FIGS. 11A to 11C are diagrams for describing a method of reading out a plurality of files described with reference to FIGS. 10A and 10B. For convenience of description, it is assumed that the first to fourth files FL1-1 to FL4-1 described with reference to FIGS. 10A and 10B are respectively loaded into the plurality of memories MEM1 to MEM4. That is, the first memory MEM1 may include the first file FL1-1 including the 1*a*-th, 2*b*-th, and 3*c*-th weight fragments W1*a*, W2*b*, and W3*c*, the second memory MEM2 may include the second file FL2-1 including the 1*b*-th, 2*c*-th, and 4*a*-th weight fragments W1*b*, W2*c*, and W4*a*, the third memory MEM3 may include the third file FL3-1 including the 1*c*-th, 3*a*-th, and 4*b*-th weight fragments W1*c*, W3*a*, and W4*b*, and the fourth memory MEM4 may include the fourth file FL4-1 including 2*a*-th, 3*b*-th, and 4*c*-th weight fragments W2*a*, W3*b*, and W4*c*.

First, referring to FIGS. 10A, 10B, and 11A, during the A-th DMA period from t0 to t1, the first memory controller MCT1 may read out the 1*a*-th weight fragment W1*a* from the first memory MEM1, the second memory controller MCT2 may read out the 1*b*-th weight fragment W1*b* from the second memory MEM2, the third memory controller MCT3 may read out the 1*c*-th weight fragment W1*c* from the third memory MEM3, and the fourth memory controller MCT4 may read out the 2*a*-th weight fragment W2*a* from the fourth memory MEM4. The accelerator 220 may generate the first lightening weight data LWD1-1 based on the 1*a*-th, 1*b*-th, and 1*c*-th weight fragments W1*a*, W1*b*, and W1*c*. The weight fragment W2*a* may be maintained in the internal buffer 221 of the accelerator 220.

Next, referring to FIGS. 10A, 10B, and 11B, during the B-th DMA period from t1 to t2, the first memory controller MCT1 may read out the 2*b*-th weight fragment W2*b*, the second memory controller MCT2 may read out the 2*c*-th weight fragment W2*c*, the third memory controller MCT3 may read out the 3*a*-th weight fragment W3*a*, and the fourth memory controller MCT4 may read out the 3*b*-th weight fragment W3*b*. The accelerator 220 may generate the second lightening weight data LWD2-1 based on the 2*a*-th weight fragment W2*a* read out by the fourth memory controller MCT4 in the A-th DMA period and the 2*b*-th and 2*c*-th weight fragments W2*b* and W2*c* respectively read out by the first and second memory controllers MCT and MCT2 in the B-th DMA period. The 3*a*-th and 3*b*-th weight fragments W3*a* and W3*b* may be maintained in the internal buffer 221 of the accelerator 220.

Then, referring to FIGS. 10A, 10B, and 11C, during the C-th DMA period from t2 to t3, the first memory controller MCT1 may read out the 3*c*-th weight fragment W3*c*, the second memory controller MCT2 may read out the 4*a*-th weight fragment W4*a*, the third memory controller MCT3 may read out the 4*b*-th weight fragment W4*b*, and the fourth memory controller MCT4 may read out the 4*c*-th weight fragment W4*c*. The accelerator 220 may generate the third lightening weight data LWD3-1 based on the 3*a*-th and 3*b*-th weight fragment W3*a* and W3*b* read out by the third and fourth memory controllers MCT3 and MCT4 in the B-th DMA period and the 3*c*-th weight fragment W3*c* read out by the first memory controller MCT in the C-th DMA period. The accelerator 220 may generate the fourth lightening weight data LWD4-1 based on the 4*a*-th to 4*c*-th weight fragments W4*a* to W4*c* respectively read out by the second to fourth memory controllers MCT2 to MCT4 in the C-th DMA period.

As described above, according to at least one embodiment of the present disclosure, the host 100 may generate the lightening weight file FILE_LWD by performing lightening and aligning on the weight data WD based on the configuration information CONFIG of the computing device 200. The lightening weight file FILE_LWD may be loaded into the plurality of memories MEM1 to MEM4 of the computing device 200. In this case, the accelerator 220 of the computing device 200 may read out the lightening weight file FILE_LWD by the DMA operations on the plurality of memories MEM1 to MEM4 in parallel or individually and may obtain lightening weight data by using weight fragments included in the lightening weight file FILE_LWD. Accordingly, because a speed at which the accelerator 220 of the computing device 200 accesses lightening weight data is improved, the performance of the computing device 200 is improved.

Figure 12:
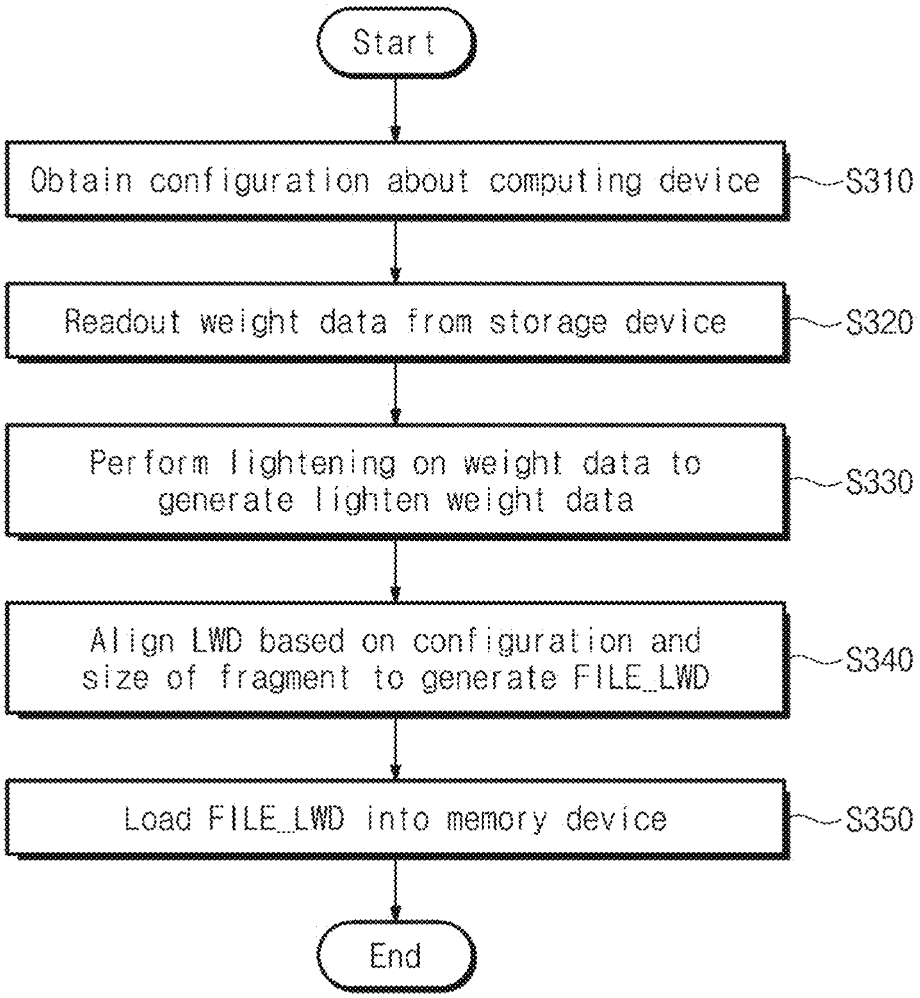
FIG. 12 is a flowchart illustrating an operation of a host of FIG. 1.

FIG. 12 is a flowchart illustrating an operation of a host of FIG. 1. Referring to FIGS. 1 and 12, in operation S310, the host 100 may obtain the configuration information CONFIG from the computing device 200. In operation S320, the host 100 may read out the weight data WD from the storage device 300. In operation S330, the host 100 may perform lightening on the weight data WD to generate the lightening weight data LWD. Operation S310 to operation S330 are similar to operation S110 to operation S130 described with reference to FIG. 2, and thus, additional description will be omitted to avoid redundancy.

In operation S340, the host 100 may generate the lightening weight file FILE_LWD by aligning the lightening weight data LWD based on the configuration information CONFIG and the size of a weight fragment. For example, based on the configuration information CONFIG and the size of the weight fragment, the aligning module 120 of the host 100 may generate the lightening weight file FILE_LWD such that the size of the lightening weight file FILE_LWD is minimized. Alternatively, based on the configuration information CONFIG and the size of the weight fragment, the aligning module 120 of the host 100 may generate the lightening weight file FILE_LWD such that of the lightening weight file FILE_LWD is efficiently transmitted from the memory device 210 to the accelerator 220. Operation S340, that is, the aligning operation will be described in detail with reference to FIGS. 13A to 16.

In operation S350, the host 100 may load the lightening weight file FILE_LWD into the memory device 210.

Figure 13A:
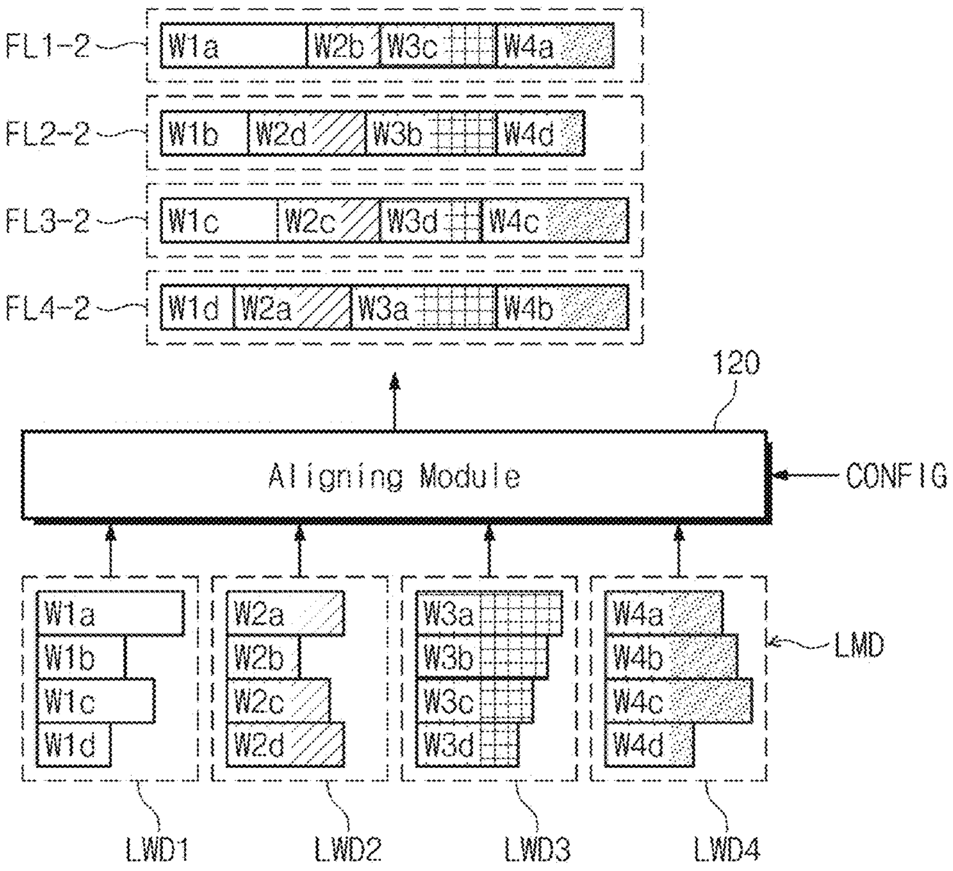
FIGS. 13A and 13B are diagrams for describing an operation of an aligning module of a host of FIG. 1.
Figure 13B:
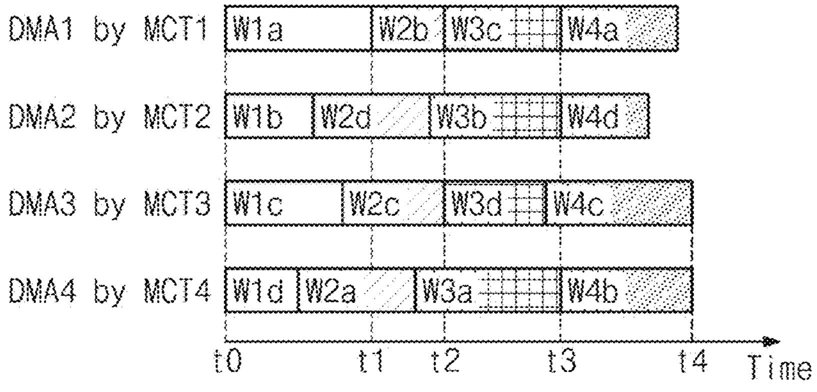

FIGS. 13A and 13B are diagrams for describing an operation of an aligning module of a host of FIG. 1. In at least one embodiment, operation S340 of FIG. 12 will be described with reference to FIGS. 13A and 13B. For convenience of description, repeat description associated with the components already described above will be omitted to avoid redundancy. Referring to FIGS. 1, 12, 13A, and 13B, the aligning module 120 of the host 100 may perform the aligning operation on the lightening weight data LWD, based on the configuration information CONFIG.

For example, the lightening weight data LWD may be a result of performing the 4-bit non-uniform quantization and the compression on the weight data WD. That is, the first lightening weight data LWD1 may include the 1*a*-th to 1*d*-th weight fragments W1*a*, W1*b*, W1*c*, and W1*d*, the second lightening weight data LWD2 may include the 2*a*-th to 2*d*-th weight fragments W2*a* to W2*d*, the third lightening weight data LWD3 may include the 3*a*-th to 3*d*-th weight fragments W3*a* to W3*d*, and the fourth lightening weight data LWD4 may include the 4*a*-th to 4*d*-th weight fragments W4*a* to W4*d*.

The aligning module 120 may place the 1*a*-th to 1*d*-th weight fragments W1*a*, W1*b*, W1*c*, and W1*d* of the first lightening weight data LWD1 in first to fourth files FL1-2 to FL4-2, respectively. Afterwards, the aligning module 120 may place the 2*a*-th to 2*d*-th weight fragments W2*a* to W2*d* of the second lightening weight data LWD2 in the first to fourth files FL1-2 to FL4-2, respectively, based on sizes of the 1*a*-th to 1*d*-th weight fragments W1*a*, W1*b*, W1*c*, and W1*d* of the first lightening weight data LWD1 and sizes of the 2*a*-th to 2*d*-th weight fragments W2*a* to W2*d* of the second lightening weight data LWD2.

For example, the 1*a*-th weight fragment Wal among the 1*a*-th to 1*d*-th weight fragments W1*a*, W1*b*, W1*c*, and W1*d* may have the longest length or the largest size. In this case, the 2*b*-th weight fragment W2*b* having the shortest length or the smallest size from among the 2*a*-th to 2*d*-th weight fragments W2*a* to W2*d* may be added to the first file FL1-2 such that the 2*b*-th weight fragment W2*b* is placed after the 1*a*-th weight fragment W1*a*.

The 1*c*-th weight fragment W1*c* among the 1*a*-th to 1*d*-th weight fragments W1*a*, W1*b*, W1*c*, and W1*d* may have the second longest length or the second largest size. In this case, the 2*c*-th weight fragment W2*c* having the second shortest length or the second smallest size from among the 2*a*-th to 2*d*-th weight fragments W2*a* to W2*d* may be added to the second file FL3-2 such that the 2*c*-th weight fragment W2*c* is placed after the 1*c*-th weight fragment W1*c*.

The 1*b*-th weight fragment W1*b* among the 1*a*-th to 1*d*-th weight fragments W1*a*, W1*b*, W1*c*, and W1*d* may have the third longest length or the third largest size. In this case, the 2*d*-th weight fragment W2*d* having the third shortest length or the third smallest size from among the 2*a*-th to 2*d*-th weight fragments W2*a* to W2*d* may be added to the second file FL2-2 such that the 2*d*-th weight fragment W2*d* is placed after the 1*b*-th weight fragment W1*b*.

The 1*d*-th weight fragment W1*d* among the 1*a*-th to 1*d*-th weight fragments W1*a*, W1*b*, W1*c*, and W1*d* may have the shortest length or the smallest size. In this case, the 2*a*-th weight fragment W2*a* having the longest length or the largest size from among the 2*a*-th to 2*d*-th weight fragments W2*a* to W2*d* may be added to the fourth file FL4-2 such that the 2*a*-th weight fragment W2*a* is placed after the 1*d*-th weight fragment W1*d*.

Likewise, the aligning module 120 may place the 3*a*-th to 3*d*-th weight fragments W3*a* to W3*d* of the third lightening weight data LWD3 and the 4*a*-th to 4*d*-th weight fragments W4*a* to W4*d* of the fourth lightening weight data LWD4 in the first to fourth files FL1-2 to FL4-2, respectively, based on sizes of the 3*a*-th to 3*d*-th weight fragments W3*a* to W3*d* of the third lightening weight data LWD3 and sizes of the 4*a*-th to 4*d*-th weight fragments W4*a* to Wad of the fourth lightening weight data LWD4.

According to the above description, the first file FL1-2 may include the 1*a*-th, 2*b*-th, 3*c*-th, and 4*a*-th weight fragments W1*a*, W2*b*, W3*c*, and W4*a*, the second file FL2-2 may include the 1*b*-th, 2*d*-th, 3*b*-th, and 4*d*-th weight fragments W1*b*, W2*d*, W3*b*, and W4*d*, the third file FL3-2 may include the 1*c*-th, 2*c*-th, 3*d*-th, and 4*c*-th weight fragments W1*c*, W2*c*, W3*d*, and W4*c*, and the fourth file FL4-2 may include the 1*d*-th, 2*a*-th, 3*a*-th, and 4*b*-th weight fragments W1*d*, W2*a*, W3*a*, and W4*b*.

The first to fourth files FL1-2 to FL4-2 may be respectively loaded into the first to fourth memories MEM1 to MEM4. The accelerator 220 may read out the first to fourth files FL1-2 to FL4-2 or weight fragments from the first to fourth memories MEM1 to MEM4.

For example, as illustrated in FIG. 13B, the first memory controller MCT1 may sequentially receive the 1*a*-th, 2*b*-th, 3*c*-th, and 4*a*-th weight fragments W1*a*, W2*b*, W3*c*, and W4*a* from the first memory MEM1 through the first DMA operation, and the second memory controller MCT2 may sequentially receive the 1*b*-th, 2*d*-th, 3*b*-th, and 4*d*-th weight fragments W1*b*, W2*d*, W3*b*, and W4*d* from the second memory MEM2 through the second DMA operation, the third memory controller MCT3 may sequentially receive the 1c-th, 2c-th, 3d-th, and 4c-th weight fragments W1c, W2c, W3d, and W4c from the third memory MEM3 through the third DMA operation, and the fourth memory controller MCT4 may sequentially receive the 1d-th, 2a-th, 3a-th, and 4b-th weight fragments W1d, W2a, W3a, and W4b from the fourth memory MEM4 through the fourth DMA operation.

At the first point in time t1, the accelerator 220 may generate the first lightening weight data LWD1; at the second point in time t2, the accelerator 220 may generate the second lightening weight data LWD2; at the third point in time t3, the accelerator 220 may generate the third lightening weight data LWD3; and, at the fourth point in time t4, the accelerator 220 may generate the fourth lightening weight data LWD4.

In at least one embodiment, as illustrated in FIGS. 13A and 13B, the plurality of files FL1-2 to FL4-2 may be generated based on sizes of weight fragments. In this case, because the size of each of the plurality of files FL1-2 to FL4-2 is optimized or minimized, the DMA time between the memory device 210 and the accelerator 220 may be shortened. For example, when the size of a weight fragment is not considered, weight fragments with a relatively large size may be focused on a specific file or a specific memory. In this case, a DMA time for the specific file or the specific memory may increase. In contrast, according to the embodiment of FIGS. 13A and 13B, because weight fragments with a relatively large size (or weight fragments with a relatively small size) are distributed to the plurality of files FL1-2 to FL4-2, the length of each of the plurality of files FL1-2 to FL4-2 may become relatively short. In this case, the DMA time for each of the plurality of memories MEM1 to MEM4 may be shortened.

Figure 14A:
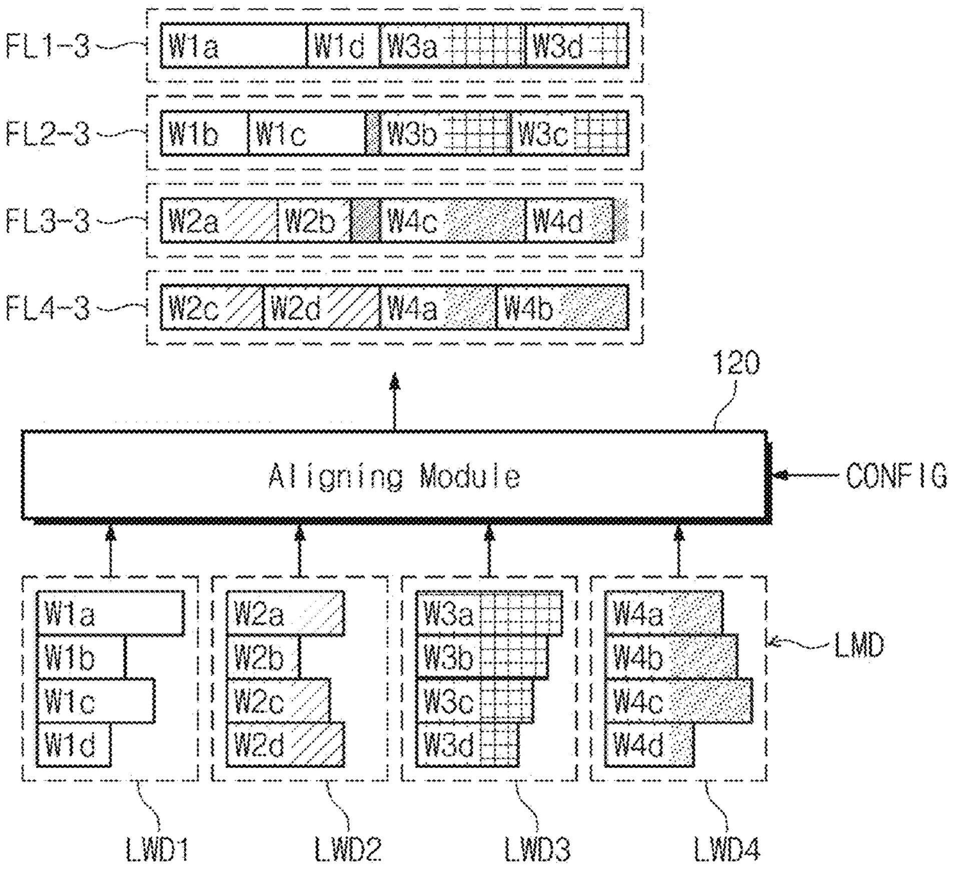
FIGS. 14A and 14B are diagrams for describing an operation of an aligning module of a host of FIG. 1.
Figure 14B:
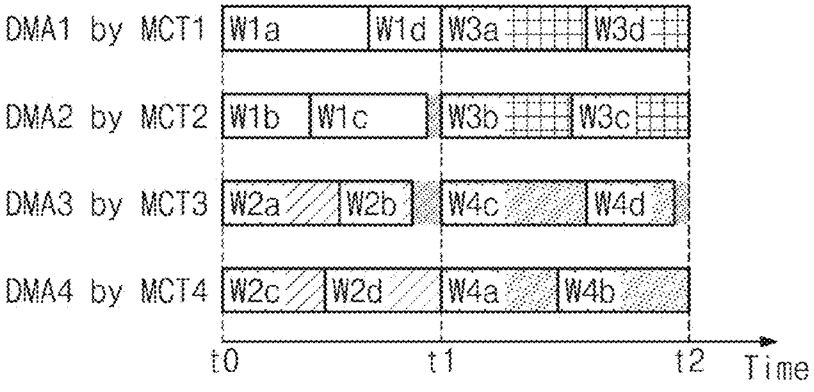

FIGS. 14A and 14B are diagrams for describing an operation of an aligning module of a host of FIG. 1. Referring to FIGS. 1, 14A, and 14B, the aligning module 120 of the host 100 may perform the aligning operations on the lightening weight data LWD or LWD1 to LWD4 based on the configuration information CONFIG and may generate a plurality of files FL1-3 to FL4-3. The lightening weight data LWD or LWD1 to LWD4 and the weight fragments W1a to W4d included in each of the lightening weight data LWD or LWD1 to LWD4 are described with reference to FIG. 4, and thus, additional description will be omitted to avoid redundancy.

In the above embodiments, the aligning module 120 may distribute weight fragments corresponding to one weight data to different files, respectively. In contrast, in the embodiment of FIGS. 14A and 14B, the aligning module 120 of the host 100 may distribute "k" weight fragments (k being a natural number) corresponding to one weight data to "n" files (n being a natural number smaller than k). For example, the aligning module 120 may distribute the weight fragments W1a, W1b, W1c, and W1d of the first lightening weight data LWD1 to the first and second files FL1-3 and FL2-3, may distribute the weight fragments W2a, W2b, W2c, and W2d of the second lightening weight data LWD2 to the third and fourth files FL3-3 and FL4-3, may distribute the weight fragments W3a, W3b, W3c, and W3d of the third lightening weight data LWD3 to the first and second files FL1-3 and FL2-3, and may distribute the weight fragments W4a, W4b, W4c, and W4d of the fourth lightening weight data LWD4 to the third and fourth files FL3-3 and FL4-3.

In this case, the first file FL1-3 may include the 1a-th, 1d-th, 3a-th, and 3d-th weight fragments W1a, W1d, W3a, and W3d, the second file FL2-3 may include the 1b-th, 1c-th, 3b-th, and 3c-th weight fragments W1b, W1c, W3b, and W3c, the third file FL3-3 may include the 2a-th, 2b-th, 4c-th, and 4d-th weight fragments W2a, W2b, W4c, and W4d, and the fourth file FL4-3 may include the 2c-th, 2d-th, 4a-th, and 4b-th weight fragments W1c, W2d, W4a, and W4b.

A way to allocate weight fragments (e.g., a way to distribute weight fragments based on sizes of the weight fragments or a way to add padding data) is similar to that described above except that the number of weight fragments allocated to the same file from among weight fragments corresponding to the same lightening weight data is different from that described above, and thus, additional description will be omitted to avoid redundancy.

In at least one embodiment, the aligning module 120 of the host 100 may generate the first to fourth files FL1-3 to FL4-3 such that two weight fragments are read out from the first to fourth memories MEM1 to MEM4 in one DMA period. In this case, in each of the first to fourth memories MEM1 to MEM4, padding data may be added such that two weight fragments have the same length or size.

For example, as illustrated in FIG. 14A, padding data may be added after the 1b-th and 1c-th weight fragments of the second file FL2-3 and after the 2a-th and 2b-th weight fragments W2a and W2b of the third file FL3-3 such that a first size of the 1a-th and 1d-th weight fragments W1a and W1d of the first file FL1-3, a second size of the 1b-th and 1c-th weight fragments W1b and W1c of the second file FL2-3, a third size of the 2a-th and 2b-th weight fragments W2a and W2b of the third file FL3-3, and a fourth size of the 2c-th and 2d-th weight fragments W2c and W2d of the fourth file FL4-3 are identical to each other. Padding data may be added after the 4c-th and 4d-th weight fragments W4c and W4d of the third file FL3-3 such that a fifth size of the 3a-th and 3d-th weight fragments W3a and W3d of the first file FL1-3, a sixth size of the 3b-th and 3c-th weight fragments W3b and W3c of the second file FL2-3, a seventh size of the 4c-th and 4d-th weight fragments W4c and W4d of the third file FL3-3, and an eighth size of the 4a-th and 4b-th weight fragments W4a and W4b of the fourth file FL4-3 are identical to each other. In this case, the addition of the padding data may be minimized.

The first to fourth files FL1-3 to FL4-3 thus generated may be loaded into the first to fourth memories MEM1 to MEM4 and may be read out by the accelerator 220. For example, as illustrated in FIG. 14B, the first memory controller MCT1 may sequentially receive the 1a-th-1d-th, 3a-th, and 3d-th weight fragments W1a, W1d, W3a, and W3d from the first memory MEM1 through a first DMA operation. The second memory controller MCT2 may sequentially receive the weight 1b-th, 1c-th, 3b-th, and 3c-th weight fragments W1b, W1c, W3b, and W3c from the second memory MEM2 through a second DMA operation. The third memory controller MCT3 may sequentially receive the weight 2a-th, 2b-th, 4c-th, and 4d-th weight fragments W2a, W2b, W4c, and W4d from the third memory MEM3 through a third DMA operation. The fourth memory controller MCT4 may sequentially receive the 2c-th-2d-th, 4a-th, and 4b-th weight fragments W2c, W2d, W4a, and W4b from the fourth memory MEM4 through a fourth DMA operation.

At a first point in time t1, the accelerator 220 may generate the first lightening weight data LWD1 by using the 1a-th, 1b-th, 1c-th, and 1d-th weight fragments W1a, W1b, W1c, and W1d and may generate the second lightening weight data LWD2 by using the 2a-th, 2b-th, 2c-th, and 2d-th weight fragments W2a, W2b, W2c, and W2d. At a second point in time t2, the accelerator 220 may generate the third lightening weight data LWD3 by using the 3a-th, 3b-th, 3*c*-th, and 3*d*-th weight fragments W3*a*, W3*b*, W3*c*, and W3*d* and may generate the fourth lightening weight data LWD4 by using the 4*a*-th, 4*b*-th, 4*c*-th, and 4*d*-th weight fragments W4*a*, W4*b*, W4*c*, and W4*d*.

Figure 15:
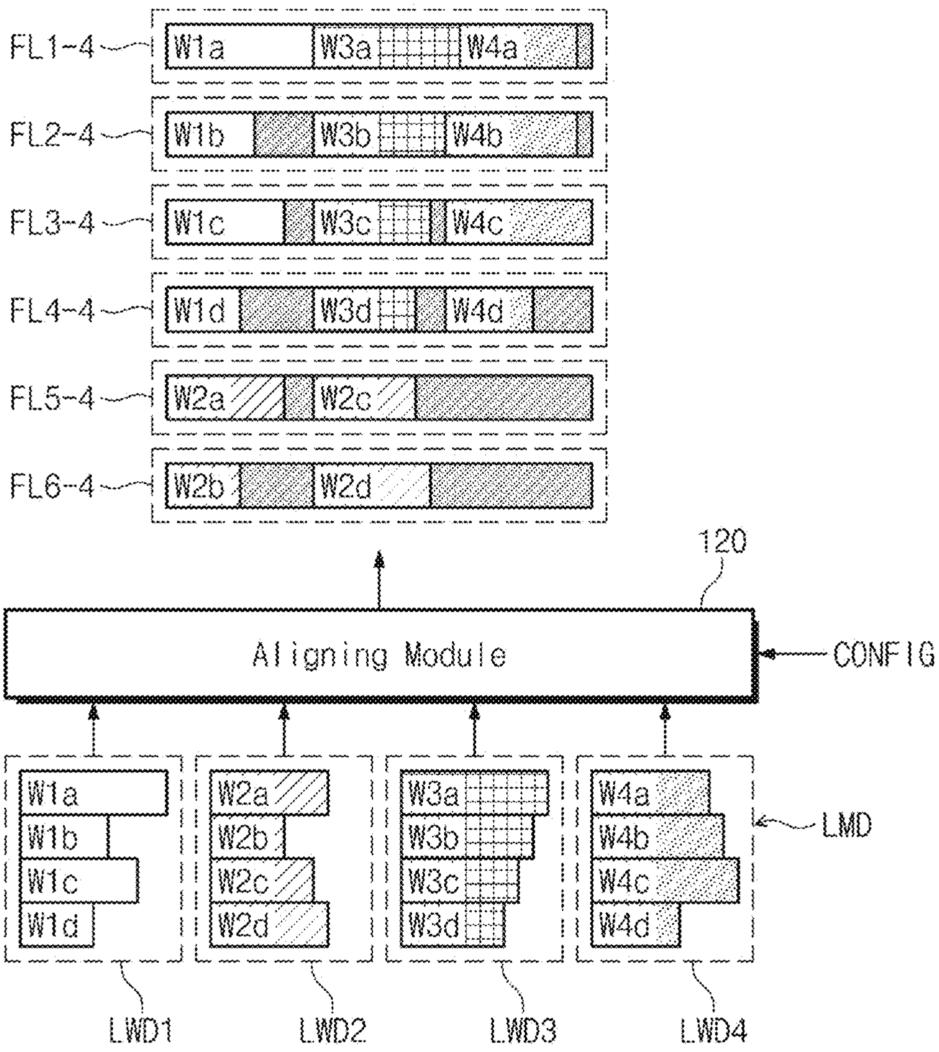
FIG. 15 is a diagram for describing an operation of an aligning module of a host of FIG. 1.

FIG. 15 is a diagram for describing an operation of an aligning module of a host of FIG. 1. Referring to FIGS. 1 and 15, the aligning module 120 of the host 100 may perform the aligning operations on the lightening weight data LWD or LWD1 to LWD4 based on the configuration information CONFIG and may generate a plurality of files FL1-4 to FL6-4. The lightening weight data LWD or LWD1 to LWD4 and the weight fragments W1*a* to W4*d* included in each of the lightening weight data LWD or LWD1 to LWD4 are described with reference to FIG. 4, and thus, additional description will be omitted to avoid redundancy.

In the present example, the memory device 210 and the accelerator 220 of the computing device 200 communicate with each other through the four channels CH1 to CH4. In this case, the aligning module 120 may generate the four files FL1 to FL4, FL1-1 to FL4-1, FL1-2 to FL4-2, or FL1-3 to FL4-3 to be stored in the memories MEM1 to MEM4 respectively corresponding to the four channels CH1 to CH4. However, the present disclosure is not limited thereto.

As an example, the memory device 210 and the accelerator 220 of the computing device 200 may communicate with each other through six channels. In this case, the aligning module 120 may generate sixth files FL1-4 to FL6-4. For example, the aligning module 120 may distribute the weight fragments W1*a*, W1*b*, W1*c*, and W1*d* of the first lightening weight data LWD1 to the first, second, third, and fourth files FL1-4, FL2-4, FL3-4, and FL4-4. The aligning module 120 may distribute the weight fragments W3*a*, W3*b*, W3*c*, and W3*d* of the third lightening weight data LWD3 to the first, second, third, and fourth files FL1-4, FL2-4, FL3-4, and FL4-4. The aligning module 120 may distribute the weight fragments W4*a*, W4*b*, W4*c*, and W4*d* of the fourth lightening weight data LWD4 to the first, second, third, and fourth files FL1-4, FL2-4, FL3-4, and FL4-4. The aligning module 120 may distribute the weight fragments W2*a*, W2*b*, W2*c*, and W2*d* of the second lightening weight data LWD2 to the fifth and sixth files FL5-4 and FL6-4.

In this case, the first file FL1-4 may include the 1*a*-th, 3*a*-th, and 4*a*-th weight fragments W1*a*, W3*a*, and W4*a*, the second file FL2-4 may include the 1*b*-th, 3*b*-th, and 4*b*-th weight fragments W1*b*, W3*b*, and W4*b*, the third file FL3-4 may include the 1*c*-th, 3*c*-th, and 4*c*-th weight fragments W1*c*, W3*c*, and W4*c*, the fourth file FL4-4 may include the 1*d*-th, 3*d*-th, and 4*d*-th weight fragments W1*d*, W3*d*, and W4*d*, the fifth file FL5-4 may include the 2*a*-th and 2*c*-th weight fragments W2*a* and W2*c*, and the sixth file FL6-4 may include the 2*b*-th and 2*d*-th weight fragments W2*b* and W2*d*.

The aligning module 120 may add padding data such that pieces of data to be accessed in one DMA period have the same sizes. A way to add padding data is described above, and thus, additional description will be omitted to avoid redundancy.

The first to sixth files FL1-4 to FL6-4 may be respectively loaded into six memories configured to communicate with the accelerator 220 through the six channels. The accelerator 220 may access the first to sixth files FL1-4 to FL6-4 from the six memories through the six channels independently or in parallel and may generate the first to fourth lightening weight data LWD1 to LWD4.

Figure 16:
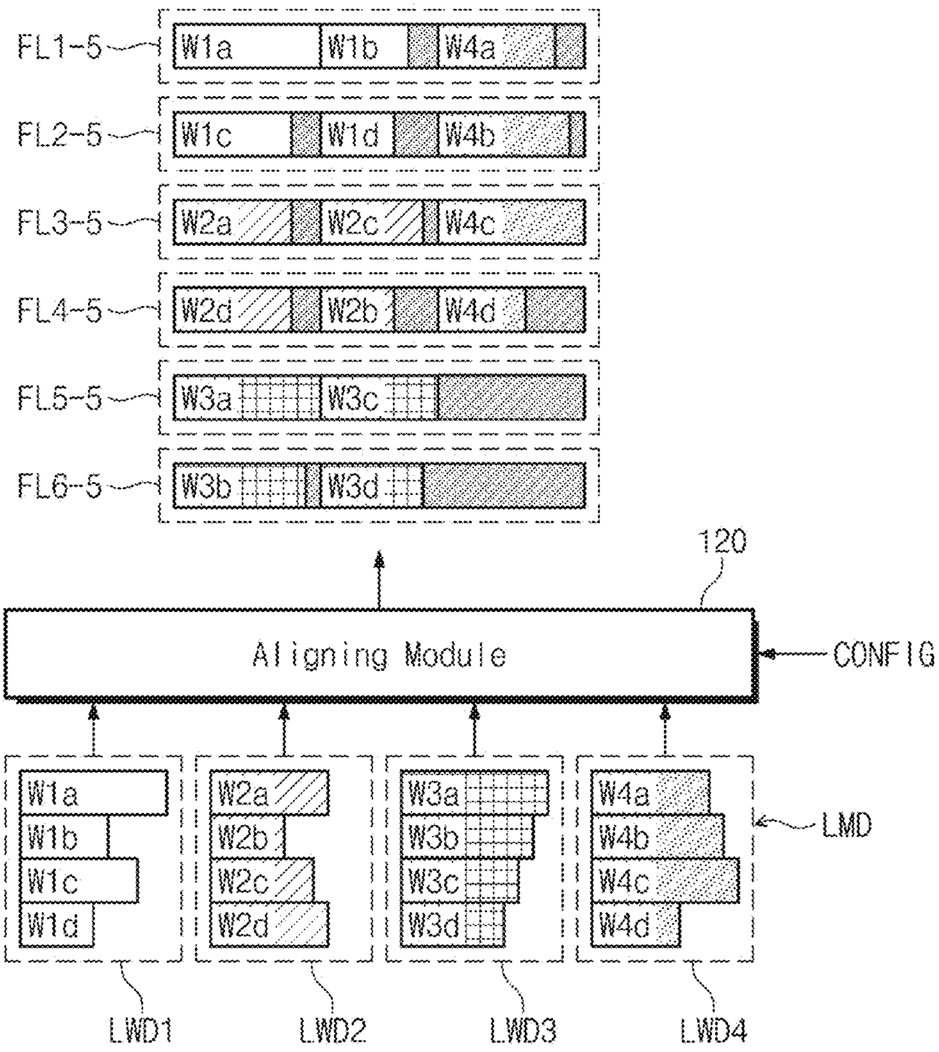
FIG. 16 is a diagram for describing an operation of an aligning module of a host of FIG. 1.

FIG. 16 is a diagram for describing an operation of an aligning module of a host of FIG. 1. Referring to FIGS. 1 and 16, the aligning module 120 of the host 100 may perform the aligning operations on the lightening weight data LWD or LWD1 to LWD4 based on the configuration information CONFIG and may generate a plurality of files FL1-5 to FL6-5. The lightening weight data LWD or LWD1 to LWD4 and the weight fragments W1*a* to W4*d* included in each of the lightening weight data LWD or LWD1 to LWD4 are described with reference to FIG. 4, and thus, additional description will be omitted to avoid redundancy.

In the embodiment of FIG. 16, the aligning module 120 may distribute weight fragments corresponding to one weight data to two files. For example, the aligning module 120 may distribute the weight fragments W1*a*, W1*b*, W1*c*, and W1*d* of the first lightening weight data LWD1 to the first and second files FL1-5 and FL2-5. The aligning module 120 may distribute the weight fragments W2*a*, W2*b*, W2*c*, and W2*d* of the second lightening weight data LWD2 to the third and fourth files FL3-5 and FL4-5. The aligning module 120 may distribute the weight fragments W3*a*, W3*b*, W3*c*, and W3*d* of the third lightening weight data LWD3 to the fifth and sixth files FL5-5 and FL6-5. The aligning module 120 may distribute the weight fragments W4*a*, W4*b*, W4*c*, and W4*d* of the fourth lightening weight data LWD4 to the first, second, third, and fourth files FL1-4, FL2-4, FL3-4, and FL4-4.

In this case, the first file FL1-5 may include the 1*a*-th, 1*b*-th, and 4*a*-th weight fragments W1*a*, W1*b*, and W4*a*, the second file FL2-5 may include the 1*c*-th, 1*d*-th, and 4*b*-th weight fragments W1*c*, W1*d*, and W4*b*, the third file FL3-5 may include the 2*a*-th, 2*c*-th, and 4*c*-th weight fragments W2*a*, W2*c*, and W4*c*, the fourth file FL4-5 may include the 2*b*-th, 2*d*-th, and 4*d*-th weight fragments W2*b*, W2*d*, and W4*d*, the fifth file FL5-5 may include the 3*a*-th and 3*c*-th weight fragments W3*a* and W3*c*, and the sixth file FL6-5 may include the 3*b*-th and 3*d*-th weight fragments W3*b* and W3*d*.

The first to sixth files FL1-4 to FL6-4 may be respectively loaded into six memories configured to communicate with the accelerator 220 through the six channels. The accelerator 220 may access the first to sixth files FL1-4 to FL6-4 from the six memories through the six channels independently or in parallel and may generate the first to fourth lightening weight data LWD1 to LWD4.

As described above, the host 100 according to at least one embodiment of the present disclosure may generate a plurality of files by performing the lightening operation and the aligning operation on a plurality of weight data WD based on the configuration information CONFIG of the computing device 200. The host 100 may load the plurality of files into the memory device 210 of the computing device 200. In this case, the accelerator 220 of the computing device 200 may access the plurality of files from the memory device 210 in parallel. This may mean that a time taken for the accelerator 220 to obtain weight data is shortened.

In at least one embodiment, the host 100 may provide the computing device 200 with weight fragment information about weight fragments included in the plurality of files (e.g., with a start address and an offset of each of the weight fragments). The computing device 200 may read out the plurality of files from the memory device 210 based on the weight fragment information and may identify the weight fragments from the plurality of files. For example, the accelerator 220 may perform DMA setting for the plurality of memory controllers MCT1 to MCT4 based on the weight fragment information. The plurality of memory controllers MCT1 to MCT4 may perform the DMA operations on the plurality of memories MEM1 to MEM4 of the memory device 210 based on the DMA setting, and thus, the weight fragments may be identified.

In at least one embodiment, the host 100 may provide the weight fragment information to the computing device 200 through a separate communication line. Alternatively, the host 100 may load the weight fragment information into a given region of the memory device 210. The accelerator 220 of the computing device 200 may access the given region of the memory device 210 to obtain the weight fragment information and may access the plurality of files based on the obtained weight fragment information.

The above embodiments are provided to describe the present disclosure easily, and the present disclosure is not limited thereto. For example, the configuration information CONFIG of the computing device 200 may include information about n-bit quantization and information about "k" channels. In this case, each of a plurality of lightening weight data generated by the lightening module 110 of the host 100 may be divided into "n" weight fragments, the sizes of which are different from each other. The aligning module 120 of the host 100 may generate a plurality of files by performing the aligning operation on the weight fragments. The plurality of files may be loaded into the memory device 210 of the computing device 200, and the accelerator 220 of the computing device 200 may read out the plurality of files from the memory device 210. In this case, the aligning module 120 may generate the plurality of files based on the configuration information CONFIG such that the accelerator 220 of the computing device 200 efficiently reads out the plurality of files from the memory device 210. Accordingly, the performance of the artificial intelligence system 10 or the computing device 200 is improved.

Figure 17:
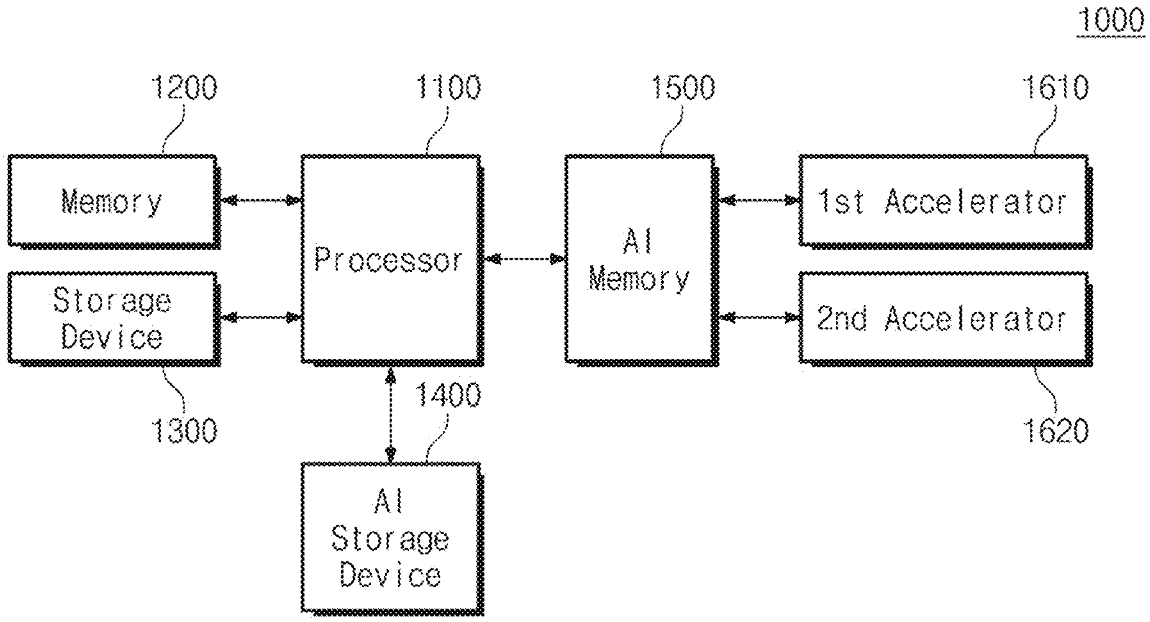
FIG. 17 is a block diagram illustrating an artificial intelligence system according to at least one embodiment of the present disclosure.

FIG. 17 is a block diagram illustrating an artificial intelligence system according to at least one embodiment of the present disclosure. Referring to FIG. 17, an artificial intelligence system 1000 may include a processor 1100, a memory 1200, a storage device 1300, an artificial intelligence storage device 1400, an artificial intelligence memory 1500, a first accelerator 1610, and a second accelerator 1620. The processor 1100 may be configured to control all the operations of the artificial intelligence system 1000. The processor 1100 may be configured to drive or execute various operating systems or various programs. The memory 1200 may be configured to be used as a system memory, a buffer memory, and/or a cache memory of the artificial intelligence system 1000. The storage device 1300 may be used as a high-capacity storage medium of the artificial intelligence system 1000.

As an example, the storage device 1300 may be configured to store information or data associated with various operating systems or various programs which are driven in the artificial intelligence system 1000. The data or information stored in the storage device 1300 may be loaded into the memory 1200, and the processor 1100 may drive or execute the operating systems or programs based on the information or data loaded into the memory 1200.

The artificial intelligence storage device 1400 may be configured to store various information, an artificial intelligence model, or weight data for an artificial intelligence computation, learning, or inference. For example, the AI artificial intelligence storage device 1400 may be and/or include the storage device 300 of FIG. 1. In at least one embodiment, the processor 1100 may generate a plurality of files by performing the lightening operation and the aligning operation on the information, the artificial intelligence model, or the weight data which are stored in the artificial intelligence storage device 1400 for the artificial intelligence computation, the learning, or the inference. The plurality of files may be stored in the artificial intelligence memory 1500. In at least one embodiment, the processor 1100 may perform the lightening operation and the aligning operation based on the method described with reference to FIGS. 1 to 16. For example, the processor 1100 may be and/or include the host 100 of FIG. 1.

The first and second accelerators 1610 and 1620 may read out the plurality of files from the artificial intelligence memory 1500 and may generate various information, an artificial intelligence model, or weight data for an artificial intelligence computation, learning, or inference based on the plurality of files. The first and second accelerators 1610 and 1620 may perform the artificial intelligence computation, the learning, or the inference based on the generated information. For example, the first and second accelerators 1610 and 1620 may each be or include an accelerator 220 of FIG. 1.

In at least one embodiment, the first and second accelerators 1610 and 1620 may share the artificial intelligence memory 1500. For example, the first and second accelerators 1610 and 1620 may access the artificial intelligence memory 1500 through the same channels. Alternatively, the first and second accelerators 1610 and 1620 may access different regions of the artificial intelligence memory 1500. For example, the first accelerator 1610 may access a first region of the artificial intelligence memory 1500 through first channels, and the second accelerator 1620 may access a second region of the artificial intelligence memory 1500 through second channels. Otherwise, the artificial intelligence memory 1500 may be the same as and/or substantially similar to the memory device 210 of FIG. 1.

In at least one embodiment, the processor 1100 may perform the lightening operation and the aligning operation based on configuration information of each of the first and second accelerators 1610 and 1620 such that each of the first and second accelerators 1610 and 1620 efficiently accesses the artificial intelligence memory 1500.

In the embodiment of FIG. 17, individual components (e.g., the artificial intelligence storage device 1400 and the artificial intelligence memory 1500) for an artificial intelligence computation, learning, or inference are illustrated, but the present disclosure is not limited thereto. The artificial intelligence storage device 1400 and/or the artificial intelligence memory 1500 may be omitted depending on the implementation of the artificial intelligence system; in this case, data, information, or weight data for an artificial intelligence computation, learning, or inference may be stored in the storage device 1300, and a plurality of files generated through the lightening operation or the aligning operation of the processor 1100 may be stored in the memory 1200. Accordingly, the first and second accelerators 1610 and 1620 may access the plurality files from the memory 1200.

According to the present disclosure, a host configured to control a computing device may generate a plurality of files based on configuration information of the computing device such that an accelerator of the computing device efficiently accesses an artificial intelligence model. The plurality of files are respectively loaded into a plurality of memories of the computing device. In this case, the accelerator of the computing device may read out the plurality of files by performing direct memory access (DMA) operations from the plurality of memories in parallel. Accordingly, an operation method of a host controlling a computing device with improved performance and an operation method of an artificial intelligence system including the computing device and the host are provided.

While the present disclosure has been described with reference to some embodiments thereof, it will be apparent to those of ordinary skill in the art that various changes and modifications may be made thereto without departing from the spirit and scope of the present disclosure as set forth in the following claims.

What is claimed is:

1. An operation method of a host configured to control a computing device performing an artificial intelligence computation, the method comprising:

receiving configuration information from the computation device;

generating a plurality of lightening weight data by performing lightening on weight data based on the configuration information to reduce the size of the weight data;

generating a plurality of files by performing an aligning operation on the plurality of lightening weight data based on the configuration information; and loading the plurality of files into a memory device of the computing device, wherein the configuration information includes channel information about a plurality of channels between the memory device of the computing device and an accelerator of the computing device, and information indicating weight fragments associated with each of the lightening weight data;

wherein a number of the plurality of files generated is equal to a number of available channels of the plurality of channels.

2. The method of claim 1, wherein the configuration information includes quantization information, and wherein the generating of the plurality of lightening weight data includes generating a plurality of unit data by performing quantization on the weight data based on the quantization information; and generating the plurality of lightening weight data by performing a compression operation on the plurality of unit data.

3. The method of claim 2, wherein the generating the plurality of lightening weight data includes generating the plurality of lightening weight data such that each of the plurality of lightening weight data includes a plurality of weight fragments and such that a number of the plurality of weight fragments included in each of the plurality of lightening weight data is based on the quantization information.

4. The method of claim 3, wherein the generating of the plurality of files by performing the aligning operation on the plurality of lightening weight data based on the configuration information includes:

distributing the plurality of weight fragments included in each of the plurality of lightening weight data to the plurality of files based on the configuration information.

5. The method of claim 4, further comprising:

providing weight fragment information about the plurality of files to the computing device, wherein the weight fragment information includes information about a start address and an offset of each of the plurality of weight fragments included in each of the plurality of files.

6. The method of claim 3, wherein the generating the plurality of files includes generating the plurality of files such that a first file among the plurality of files includes a first part of a plurality of first weight fragments included in first lightening weight data among the plurality of lightening weight data, and such that a second file among the plurality of files includes a second part of the plurality of first weight fragments included in the first lightening weight data among the plurality of lightening weight data.

7. The method of claim 6, wherein the loading the plurality of files into the memory device of the computing device includes:

loading the first file into a first memory communicating with the accelerator through a first channel from among a plurality of memories of the memory device, and loading the second file into a second memory communicating with the accelerator through a second channel from among the plurality of memories of the memory device.

8. The method of claim 7, wherein the loading the plurality of files into the memory device of the computing device includes loading the plurality of files into the memory device such that a start address of the first part included in the first file loaded into the first memory is identical to a start address of the second part included in the second file loaded into the second memory.

9. The method of claim 6, wherein the generating the plurality of files includes generating the plurality of files such that a size of the first part is larger than a size of the second part, and such that the second file further includes first padding data added to the second part.

10. The method of claim 1, wherein the generating the plurality of files includes generating the plurality of files such that sizes of the plurality of files are identical to each other.

11. The method of claim 1, wherein the generating the plurality of lightening weight data includes:

reading out the weight data from a storage device.

12. An operation method of a host configured to control a computing device performing an artificial intelligence computation, the method comprising:

receiving configuration information including information indicating weight fragments associated with lightening weight data from the computation device;

generating first lightening weight data including first weight fragments and second lightening weight data including second weight fragments by performing a lightening operation on first weight data and second weight data based on the configuration information;

generating a plurality of files by performing an aligning operation on the first weight fragments and the second weight fragments; and loading the plurality of files into a plurality of memories of the computing device, wherein the configuration information includes channel information about a plurality of channels between the plurality of memories of the computing device and an accelerator of the computing device, wherein a number of the plurality of files generated is equal to a number of the plurality of channels, wherein the first weight fragments are distributed to the plurality of files, and wherein the second weight fragments are distributed to the plurality of files.

13. The method of claim 12, wherein the configuration information includes quantization information, and wherein the generating of the first lightening weight data including the first weight fragments and the second lightening weight data including the second weight fragments by performing the lightening operation on the first weight data and the second weight data based on the configuration information includes generating a plurality of first unit data and a plurality of second unit data by performing quantization operations on the first weight data and the second weight data, respectively, based on the quantization information, and generating the first lightening weight data including the first weight fragments and the second lightening weight data including the second weight fragments by performing a compression operation on the plurality of first unit data and a compression operation on the plurality of second unit data.

14. The method of claim 12, wherein generating first lightening weight data including first weight fragments and second lightening weight data including second weight fragments includes reading out the first weight data and the second weight data from a storage device.

15. The method of claim 12, further comprising:

providing weight fragment information about the plurality of files to the computing device, wherein the weight fragment information includes information about an offset and a start address corresponding to each of the first weight fragments and the second weight fragments, and wherein the loading the plurality of files into the plurality of memories of the computing device includes loading the plurality of files into the plurality of memories such that the first weight fragments and the second weight fragments are stored in the plurality of memories based on the start address and the offset corresponding thereto.

16. An operation method of an artificial intelligence system which includes a computing device configured to perform an artificial intelligence computation and a host configured to communicate with the computing device, the method comprising:

receiving, by the host, configuration information of the computation device;

generating, by the host, a plurality of files by performing a lightening operation to reduce the size of weight data and an aligning operation on the weight data based on the configuration information;

loading, by the host, the plurality of files into a plurality of memories of the computing device;

reading out, by the computing device, the plurality of files by performing direct memory access (DMA) operations on the plurality of memories in parallel;

and performing, by the computing device, the artificial intelligence computation based on the plurality of files, wherein the configuration information includes channel information about a plurality of channels between the plurality of memories of the computing device and an accelerator of the computing device, and information indicating weight fragments associated with each of the lightening weight data; and wherein the generating, by the host, the plurality of files includes generating the plurality of files such that a number of the plurality of files is equal to a number of the plurality of channel.

17. The method of claim 16, wherein the configuration information includes quantization information, and wherein the lightening operation includes generating, by the host, a plurality of unit data by performing a quantization operation on the weight data based on the quantization information, and generating, by the host, a plurality of lightening weight data by performing a compression operation on the plurality of unit data.

18. The method of claim 17, wherein the generating, by the host, the plurality of files includes generating the plurality of files such that each of the plurality of lightening weight data includes a plurality of weight fragments, and such that the number of the plurality of weight fragments included in each of the plurality of lightening weight data corresponds to the quantization information, and wherein the aligning operation includes generating, by the host, the plurality of files by distributing the plurality of weight fragments included in each of the plurality of lightening weight data to the plurality of files.

19. The method of claim 18, wherein the reading out, by the computing device, of the plurality of files includes:

reading out, by the computing device, first weight fragments, among the plurality of weight fragments, from the plurality of memories, respectively, by performing the DMA operations on the plurality of memories in parallel, during a first time interval;

generating first weight data based on a first part of the first weight fragments; and buffering a second part of the first weight fragments.

20. The method of claim 19, wherein the reading out, by the computing device, of the plurality of files, by performing the DMA operations on the plurality of memories in parallel further includes:

reading out, by the computing device, second weight fragments, among the plurality of weight fragments, from the plurality of memories, respectively, by performing the DMA operations on the plurality of memories in parallel, during a second time interval;

generating second weight data based on a third part of the second weight fragments and the buffered second part; and buffering a fourth part of the second weight fragments.

* * * * *